United States Patent
Lu et al.

(10) Patent No.: US 10,104,407 B2
(45) Date of Patent: Oct. 16, 2018

(54) METHOD AND DEVICE FOR NETWORK-ASSISTED CLIENT-CENTRIC QOE OPTIMIZATION

(71) Applicant: Cisco Technology, Inc., San Jose, CA (US)

(72) Inventors: Zheng Lu, Milpitas, CA (US); Sangeeta Ramakrishnan, Saratoga, CA (US); Xiaoqing Zhu, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 7 days.

(21) Appl. No.: 15/292,466

(22) Filed: Oct. 13, 2016

(65) Prior Publication Data
US 2018/0109819 A1    Apr. 19, 2018

(51) Int. Cl.
*H04N 21/44* (2011.01)
*H04N 21/2387* (2011.01)
*H04L 29/08* (2006.01)
*H04N 21/472* (2011.01)
*H04N 21/258* (2011.01)
(Continued)

(52) U.S. Cl.
CPC ....... *H04N 21/2387* (2013.01); *H04L 67/303* (2013.01); *H04N 21/25808* (2013.01); *H04N 21/25891* (2013.01); *H04N 21/44* (2013.01); *H04N 21/44209* (2013.01); *H04N 21/4532* (2013.01); *H04N 21/47217* (2013.01)

(58) Field of Classification Search
CPC ......... H04N 21/2387; H04N 21/25808; H04N 21/25891; H04N 21/44; H04N 21/44209; H04N 21/4532; H04N 21/474217
See application file for complete search history.

(56) References Cited

U.S. PATENT DOCUMENTS 9,253,229 B1    2/2016  Strothmann et al.
9,276,967 B2    3/2016  Casey et al.
(Continued)

OTHER PUBLICATIONS

Georgopoulos, et al., Towards Network-wide QoE Fairness Using OpenFlow-assisted Adaptive Video Streaming, Proceedings of the ACM SIGCOMM Workshop on Future Human-Centric Mulitmedia Networking, Aug. 2013, pp. 15-20.

*Primary Examiner* — Nasser Goodarzi
*Assistant Examiner* — Adil Ocak
(74) *Attorney, Agent, or Firm* — Ronald Fernando

(57) ABSTRACT

In one implementation, a method performed by a client device includes: determining a perceptual characterization metric, where the perceptual characterization metric provides a quantitative characterization of factors that determine quality of experience associated with a first playback profile of media content presented by the client device; and normalizing the perceptual characterization metric based on characterization factors associated with the client device. The method further includes: obtaining an aggregate perceptual characterization metric that is based at least in part on the normalized perceptual characterization metric from the client device and one or more other perceptual characterization metrics from other client devices sharing at least one network resource with the client device; and determining whether to change the first playback profile based on a function of the first normalized perceptual characterization metric and the aggregate perceptual characterization metric.

18 Claims, 10 Drawing Sheets

(51) Int. Cl.
*H04N 21/442* (2011.01)
*H04N 21/45* (2011.01)

(56) References Cited

U.S. PATENT DOCUMENTS

| | | |
|---|---|---|
| 9,282,013 B2 | 3/2016 | Chandrayana et al. |
| 9,363,814 B2 | 6/2016 | Borst et al. |
| 2012/0311126 A1* | 12/2012 | Jadallah .............. H04L 41/5067 709/224 |
| 2016/0028594 A1 | 1/2016 | Ramakrishnan et al. |
| 2016/0028595 A1 | 1/2016 | Ramakrishnan et al. |
| 2016/0028647 A1 | 1/2016 | Ramakrishnan et al. |
| 2016/0028651 A1 | 1/2016 | Ramakrishnan et al. |

\* cited by examiner

METHOD AND DEVICE FOR NETWORK-ASSISTED CLIENT-CENTRIC QOE OPTIMIZATION

TECHNICAL FIELD

The present disclosure relates to data networks, and in particular, to enabling client-centric quality of experience (QoE) improvement.

BACKGROUND

In accordance with known network management methods nominal levels of bandwidth are allocated to client devices. Allocations are often made based on a subscription tier model, within which client devices in each tier receive a respective bandwidth allocation for a corresponding cost. Known quality of service (QoS) metrics for these methods are merely based on assessing whether client devices are provided with data throughput levels associated with the subscription tiers. However, perceptual playback quality of media content data can vary within a subscription tier bandwidth allocation based on characteristics of the media content data. Known network management methods do not manage shared network resources in order to influence perceptual playback quality of media content data items at a client device.

Rather, known methods of managing perceptual playback quality are typically performed by individual client devices. For example, according to adaptive bit rate (ABR) methods, each ABR-enabled client device individually detects and seizes additional available bandwidth, without regard to any substantial gains in perceptual playback quality. Thus, during video streaming, an ABR-enabled client device requests a higher bit-rate representation of a video stream after detecting newly available bandwidth.

Bandwidth is misappropriated when the higher bit-rate representation fails to provide a substantial gain in perceptual playback quality. The problem is reinforced by previously known methods in at least three ways. First, newly available bandwidth is claimed on a first-come-first-served basis, which penalizes client devices that cannot or do not act first. Second, existing network management methods fail to regulate client devices that are each operating to individually consume as much of a shared network resource as is available. Third, previously known methods prevent client devices from cooperatively sharing network resources. Consequently, individual client devices are often able to misappropriate portions of shared network resources in a way that has a negative impact on and/or limits the perceptual playback quality of media content on other client devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
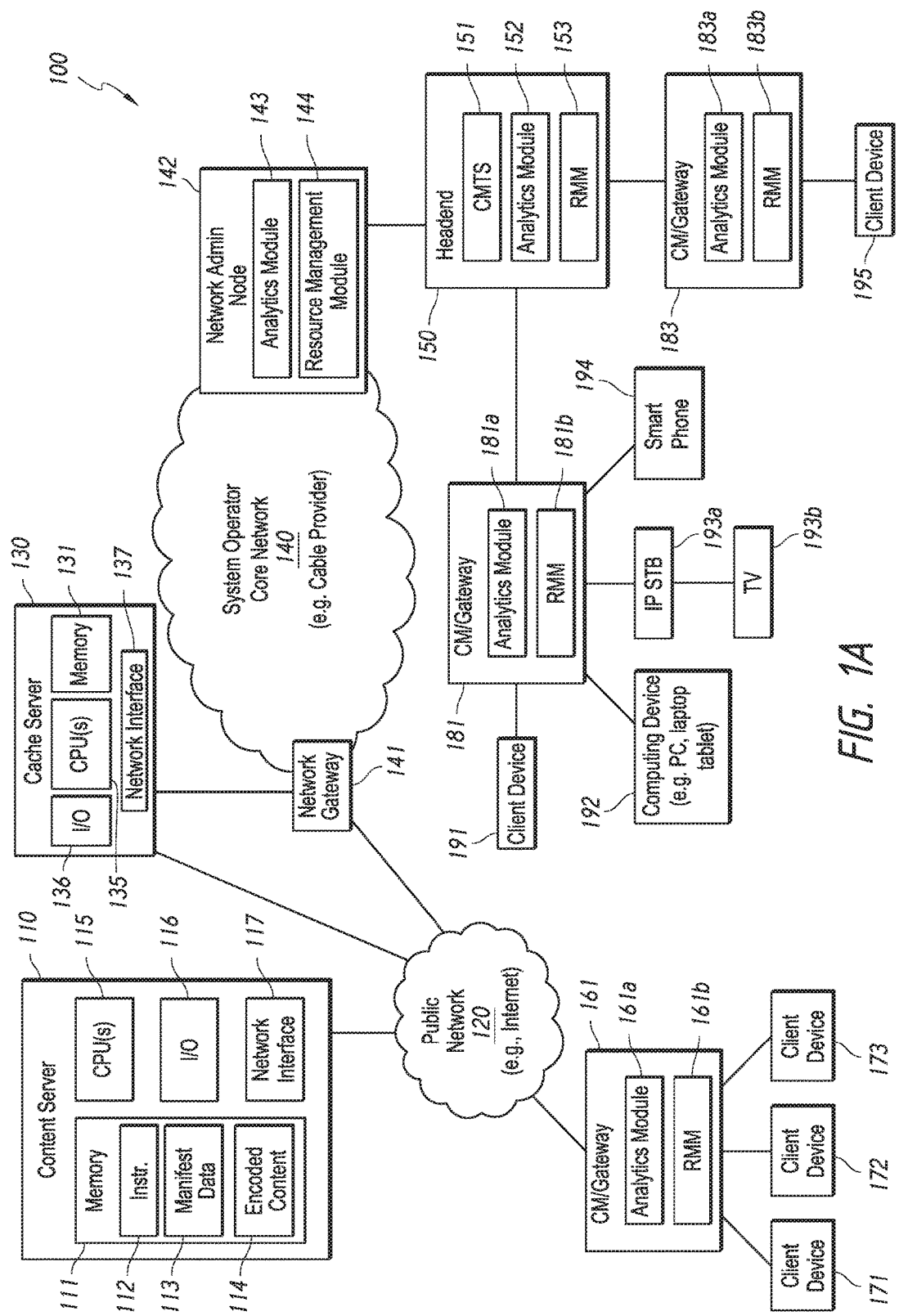
FIG. 1A is a block diagram of a data communication environment in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include devices, systems, and methods for enabling a group of client devices that share one or more network resources to cooperatively participate in the consumption of the one or more network resources in order to produce more evenly distributed perceptual playback quality levels (e.g., QoE). For example, in some implementations, a method includes: determining, by a client device, a first perceptual characterization metric, where the first perceptual characterization metric provides a corresponding quantitative characterization of factors that determine quality of experience associated with a first playback profile of media content presented by the client device; and normalizing, by the client device, the first perceptual characterization metric based on one or more client device characterization factors associated with the client device. The method further includes: obtaining, by the client device, an aggregate perceptual characterization metric (e.g., from a monitor device), where the aggregate perceptual characterization metric is based at least in part on the normalized perceptual characterization metric from the client device and one or more other perceptual characterization metrics from one or more other client devices sharing at least one network resource with the client device; and determining, by the client device, whether to change the first playback profile based on a function of the first normalized perceptual characterization metric and the aggregate perceptual characterization metric. According to some implementations, the method is performed by a client device with one or more processors and non-transitory memory.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Example Embodiments

Previously known network management methods and client device methods of managing perceptual playback quality prevent client devices from cooperatively sharing network resources. Instead previously known methods reinforce vigorous competition that results in an uneven distribution of measurable perceptual playback quality amongst client devices that share one or more network resources. By contrast, various implementations disclosed herein enable client devices that share one or more network resources to cooperatively participate in the consumption of the one or more network resources in order to produce more evenly distributed perceptual playback quality levels.

According to some implementations, the disclosed methods enable better congestion management in cellular and cable networks. As one example, where when congestion occurs, the proposed methods may decrease the bandwidth (BW) rate for client devices streaming media content that experience a higher QoE relative to other client devices sharing a same BW bottleneck (e.g., a QoE higher than the 60th percentile).

At the same time, the BW rate is maintained or increased for client devices streaming media content that experience a lower QoE relative to other client devices sharing the same BW bottleneck (e.g., a QoE lower than the 40th percentile). As a result, the saved BW can be used to reduce congestion and help improve other services that have a higher priority (e.g., perhaps unrelated to streaming media). This approach has an advantage over the existing approaches that indifferently decrease the BW rate for all media streaming client devices.

FIG. 1A is a block diagram of a data communication environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data communication environment 100 includes: a public network 120 (e.g., a portion of the Internet), a system operator core network 140 (hereinafter the "core network 140"), a content server 110, a cache server 130, and a headend node 150. The data communication environment 100 also includes subscriber gateway devices 181, 183 and a number of client devices 191, 192, 193a/b, 194, 195.

In some implementations, the core network 140 includes a private and/or subscription-based network. The core network 140 includes any local area network (LAN) and/or wide area network (WAN) such as an intranet, an extranet, a virtual private network, and/or portions of the Internet. In some implementations, the core network 140 provides communication capability between any one of the client devices 191, 192, 193a/b, 194, 195 and one or more third party service providers and/or content providers (e.g., the content server 110, the cache server 130, etc.). In some implementations, the core network 140 provides communication capability between any one of the client devices 191, 192, 193a/b, 194, 195 and one or more private content servers, storage devices, gateways, and/or service servers (not shown), as well as core network provided services and content. In various implementations, the core network 140 includes a combination of computing devices, switches, routers, server systems, enterprise memory, and data connections.

In some implementations, the core network 140 uses Hypertext Transfer Protocol (HTTP) to transport information using the Transmission Control Protocol/Internet Protocol (TCP/IP) suite. HTTP permits client devices to access various resources available via the core network 140 and/or the public network 120. However, implementations are not limited to the use of any particular protocol. One having ordinary skill in the art should understand that other networks distributing multimedia (e.g., video, graphics, audio, and/or data, or otherwise referred to also herein individually or collectively as media content or simply, content) may also benefit from certain embodiments of adaptive streaming systems and methods, and hence, are contemplated to be within the scope of the disclosure. The term "resource" or "network resource" in this specification refers to information, devices, infrastructure, and services. A resource includes, for example, bandwidth, processor time, data storage, data structures, non-transitory memory, images, video streams, network transactions, and computational objects.

As shown in FIG. 1A, in some implementations, the core network 140 includes a gateway node 141 that provides an interface for data communication external to the core network 140 (e.g., to the public network 120, the content server 110, the cache server 130, etc.). In some implementations, the gateway node 141 is provided as a single entity (e.g., a server, a virtual machine, etc.). In some implementations, the gateway node 141 is implemented as a distributed system including a suitable combination of software, data structures, virtual machines, computing devices, servers, switches, and/or routers. For the sake of brevity and convenience of explanation, the gateway node 141 is described herein as a single entity.

The core network 140 also includes a network administration node 142 (or the like), which is arranged to monitor and/or manage one or more headend nodes. Similar to the gateway node 141, the network administration node 142 is illustrated as single entity (e.g., a server, a virtual machine, etc.) in FIG. 1A. In various implementations, however, the network administration node 142 is provided as a distributed system including a suitable combination of software, data structures, virtual machines, computing devices, servers, switches, and/or routers. Accordingly, the network administration node 142 is described herein as a single entity merely for the sake of brevity and convenience of explanation.

In some implementations, the network administration node 142 includes at least one of an analytics module 143 and a resource management module 144. In some implementations, the analytics module 143 is provided to generate an aggregate perceptual characterization metric (PCM) based on PCMs or perceptual characterization indicator (PCI) values from a number of client devices that share one or more network resources. For example, the aggregate PCM corresponds to an aggregate quality of experience (QoE) metric that characterizes a distribution of local QoE level values for the client devices sharing the one or more shared network resources.

As described below, the resource management module 144 is configured to enable the management of respective levels of perceptual playback quality of media content data for a number of client devices sharing one or more network resources; and/or, to enable client devices to cooperatively participate in the consumption of the one or more network resources in order to produce more evenly distributed perceptual playback quality levels (e.g., within each subscription tier). The respective levels of perceptual playback quality are managed by adjusting client device demand for one or more shared network resources. Adjustments are made by individual client devices and are at least based on a local QoE level value in relation to an aggregate QoE metric characterizing QoE for a number of client devices sharing the one or more network resources.

In some implementations, the resource management module 144 is configured to provide the aggregate PCM to each of a number of client devices that share the one or more network resources. The analytics module 143 and the resource management module 144 are not limited to implementation in or proximate to the network administration node 142. In various implementations, modules similar to one or both are included in headend nodes or other bottleneck points. For example, in some implementations, modules similar to one or both are included in one or more of a mobile network, a mobile packet core, a WiFi access point, a cable modem, or a residential gateway device.

The headend node 150 is coupled to the network administration node 142 and/or one or more other portions of the core network 140. In some implementations, the headend node 150 is capable of data communication using the public network 120 and/or other private networks (not shown). Those of ordinary skill in the art will appreciate that a headend node is typically configured to deliver cable television (TV), cable modem services, and/or various other data services to subscriber client devices. To that end, a headend node includes a suitable combination of software, data structures, virtual machines, routers, switches, and high-availability servers. For example, the headend node 150 includes a cable modem termination server (CMTS) 151 that is used to service an allocation of bandwidth shared by a number of client devices. The CMTS 151 includes a suitable combination of hardware, software, and/or firmware for terminating one or more data channels associated with a number of client devices within the shared allocation of bandwidth.

In some implementations, the headend node 150 includes at least one of an analytics module 152 and a resource management module (RMM) 153. As described below with reference to FIG. 2, the analytics module 152 is configured to generate an aggregate PCM based on PCMs from a number of client devices that share one or more network resources available through and managed by the headend node 150. In some implementations, the RMM 153 is configured to provide the aggregate PCM to each of a number of client devices that share the one or more network resources available through the headend node 150. Further, while the analytics module 152 and the RMM 153 are shown as distinct modules, in some implementations, some or all of the functions of each are incorporated into a CMTS or the like.

In some implementations, the client devices 191, 192, 193*a/b*, 194, 195 access network resources, services, and content offerings from a respective headend node through subscriber gateway devices. For example, as shown in FIG. 1A, the subscriber gateway devices 181, 183 are coupled to the headend node 150, and thus share bandwidth (and/or other resources) available through the headend node 150. In various implementations, a subscriber gateway device includes, without limitation, devices such as cable modems (CMs), wireless access points, and Ethernet modems.

Each subscriber gateway device 181, 183 is accessible by and services a number of client devices. For example, the client device 195 is coupled to the subscriber gateway device 183. Similarly, the subscriber gateway device 181 is coupled to and delivers services and/or content to a client device 191, a computing device 192, a smartphone 194, and an Internet Protocol (IP) set-top box (STB) 193*a* (which in turn is coupled to TV 193*b*). As such, the bandwidth allocated to the subscriber gateway device 181 is shared by four devices in the example shown. The bandwidth allocated to the subscriber gateway device 181 is also a portion of the available bandwidth provided by the headend node 150. The headend node 150 also provides bandwidth allocations to the subscriber gateway device 183, which services client device 195. Thus, in this example, the total bandwidth available from the headend node 150 is ultimately shared by five client devices 191, 192, 193*a/b*, 194, and 195. Those of ordinary skill in the art will appreciate from the present disclosure that, in various implementations, a headend node can be connected to any number and combination of gateway nodes and client devices, and FIG. 1A is merely an example provided to discuss aspects of various implementations.

In some implementations, a subscriber gateway device is configured to manage access and/or assist in the management of network resources available through the subscriber gateway device to corresponding client devices. To that end, for example, the subscriber gateway device 181 includes an analytics module 181*a* and a resource management module (RMM) 181*b*. In the example shown in FIG. 1A, the analytics module 181*a* and the RMM 181*b* are provided, individually or in combination, to manage access or assist in the management of network resources available to the client devices 191, 192, 193*a/b*, and 194. In some implementations, each of the analytics module 181*a* and the RMM 181*b* include one or more respective functions of the corresponding the analytics modules 143, 152 and the resource management modules 144, 153 discussed above. Similarly, the subscriber gateway device 183 includes an analytics module 183*a* and a resource management module 183*b*.

With continued reference to FIG. 1A, the gateway device 161 is accessible by and services client devices 171, 172, and 173. As such, the client devices 171, 172, and 173 access network resources, services, and content offerings through the gateway device 161. Thus, the bandwidth allocated to the gateway device 161 is shared by the client devices 171, 172, and 173 in the example shown.

As discussed above, in some implementations, a gateway device is configured to manage access and/or assist in the management of network resources available through the gateway device to corresponding client devices. To that end, for example, the gateway device 161 includes an analytics module 161a and a resource management module (RMM) 161b. In the example shown in FIG. 1A, the analytics module 161a and the RMM 161b are provided, individually or in combination, to manage access or assist in the management of network resources available to the client devices 171, 172, and 173. In some implementations, each of the analytics module 161a and the RMM 161b include one or more respective functions of the corresponding the analytics modules 143, 152 and the resource management modules 144, 153 discussed above.

With continued reference to FIG. 1A, the content server 110 is configured to store and provide media content data. To that end, the content server 110 typically includes a non-transitory memory 111, one or more processing units (CPUs) 115, an input-output (I/O) interface 116, and a network interface 117. The network interface 117 is configured to enable communication with other devices and systems, and for example, without limitation includes a modulator/demodulator (modem for communication with another device, system, or network), a radio frequency transceiver or another type of transceiver, a telephone interface, a bridge, a router, etc. In some implementations, the I/O interface 116 includes input devices, such as but not limited to, a keyboard, mouse, scanner, microphone, etc. The I/O interface 116 may also include output devices, such as but not limited to, a display, speakers, etc.

Figure 4:
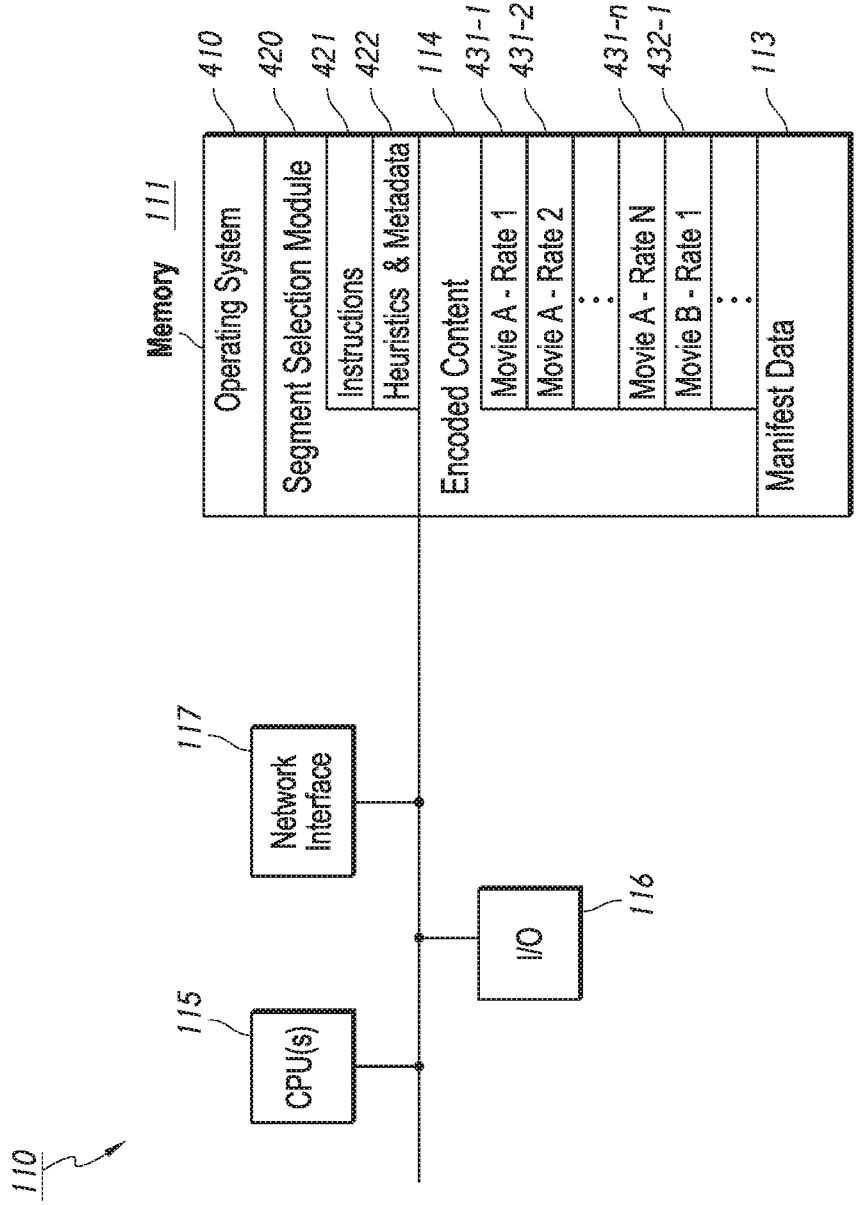
FIG. 4 is a block diagram of an example of a content server system in accordance with some implementations.

FIG. 4 is a block diagram of an example implementation of the content server system 110 of FIG. 1A in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the content server system 110 includes the one or more processing units 115, the network interface 117, the non-transitory memory 111, and the I/O interface 116. The memory 111 includes an operating system 410, which includes implementations of procedures for handling various basic system services and for performing hardware dependent tasks.

With reference to FIGS. 1A and 4, the memory 111 includes instructions 112 (421 in FIG. 4), manifest data 113, and encoded media content data 114. With reference to FIG. 1A, in some implementations, the instructions 112 enable the selection of one or more encoding rate representations and/or one or more temporal segments of a media content data item in response to a request from a client device. With reference to FIG. 4, in some implementations the content server 110 also includes a segment selection module 420. The segment selection module 420 includes instructions 421 and heuristics and metadata 422. In some implementations, the instructions 421 in combination with the heuristics and metadata 422 enable the selection of one or more encoding rate representations and/or one or more temporal segments of a media content data item in response to a request from a client device.

In some implementations, the encoded media content data 114 includes multiple representations of each of one or more media content data items. As an example, as shown in FIG. 4, the encoded media content data 114 includes data representing two movies, namely Movie A and Movie B, as example media content data items. Those of ordinary skill in the art will appreciate from the present disclosure that various other types of media content data include without limitation sports video, newscasts, music and concert videos, and various other types of TV programs, audio files and video games. Encoded content 114 includes multiple representations 431-1, 431-2, . . . , 431-n of Movie A, that are each encoded at a different bit rate than the other representations. Similarly, one of many representations of Movie B, indicated by 432-1, is also illustrated in furtherance of the example. In some implementations, a representation of a media content data item is divided into one or more temporal segments, each of which is available at one or more encoding rates.

In some implementations, the manifest data 113 includes metadata associated with each of the encoding rate representations and/or the temporal segments of the one or more media content data items. For example, the manifest data 113 includes at least one of a respective encoding rate indicator, a quality level indicator, and a duration indicator for each representation of the one or more media content data items. In some implementations, a quality level indicator is explicitly indicated (e.g., as opposed to being inferred from the encoding bit rate), with the explicit indication corresponding to a perceptual playback quality metric such as mean square error (MSE), peak signal-to-noise ratio (PSNR), mean opinion score (MOS), relative degradation, or other well-known quality metrics. In some implementations, a quality level indicator includes a respective QoE metric associated with a temporal segment of a representation of a media content data item, characterized by a particular encoding rate.

The cache server 130 is configured to provide replicas of at least some of the media content data and associated metadata stored and provided by the content server 110. In various implementations, the cache server 130 is similarly configured to the content server 110, and includes, without limitation, one or more processing units (CPUs) 135, non-transitory memory 131, a network interface 137, and an I/O interface 136. In some implementations, a request for media content data item from a client device is initially directed to or redirected to the cache server 130, when the cache server 130 is closer to the client device than the content server 110. The cache server 130 can also be used to supplement the content server 110 during times of excessive traffic.

Although FIG. 1A illustrates a number of discrete elements, FIG. 1A is intended to highlight various aspects of a network rather than to serve as a schematic strictly indicative of various network implementations. Thus, in various implementations, a network includes a subset or superset of the elements illustrated in FIG. 1A. As such, a combination of elements could be implemented by a single element and some singular elements could be implemented by one or more elements. The number of elements and how various features and functions are allocated can vary between implementations, and may depend in part on the amount of traffic a network is configured to handle during various usage periods (e.g., peak, average, low, etc.).

In operation, various encoding rate representations of media content data items can be provided to client devices (e.g., client device 191) in a number of ways. For example, in ABR-enabled systems, a media content item (e.g., a particular movie, sportscast, etc.) is typically sub-divided into temporal segments (e.g., 2 to 10 seconds long) that are each encoded at respective bit rates. To that end, multiple representations of each segment are stored and made available by the content server 110 to client devices. The encoding bit rate of each segment representation in part characterizes the perceptual playback quality of the segment representation. Since each representation of a segment is encoded at a different bit rate, each representation has a different amount of data, and thus uses a different combination of bandwidth and/or time for transmission.

Additionally, a variety of storage structures can be used for ABR media content data, such as directories with individual files for each segment, standardized file formats, and/or custom packaging schemes. In some implementations, the structure of the media content data, along with associated metadata associated with each segment, is contained in a separate structure, referred to above as a manifest (e.g., the manifest data 113 in FIGS. 1A and 4). In some implementations, the manifest data 113 also includes a respective quality level indicator that explicitly indicates the perceptual playback quality of each segment representation. More specifically, in some implementations, a quality level indicator provides a quantitative characterization of the perceptual playback quality of a segment representation for a client device that has the playback capability to achieve the indicated level of quality. As noted above, various quality level indicators include, without limitation, metrics such as MSE, PSNR, MOS, relative degradation, or other well-known quality metrics.

According to some implementations, an ABR-enabled client device selects and transmits a request (e.g., an HTTP GET command) for a specific segment representation from the content server 110. The selection decision is based on various parameters including the subscription tier bandwidth allocated to the client device and the amount of data currently residing in a playout buffer of the client device. As noted above, in accordance with previously known ABR client device methods, there is a general bias towards enabling a client device to consume as much bandwidth as is available to the client device. As a result, an ABR-enabled client device typically operates to select representations of segments with high encoding rates so that the client device consumes the bandwidth allocated to it based on an associated subscription tier. The typical ABR-enabled client device is also biased towards consuming bandwidth in excess of the allocation provided under the associated subscription tier when additional bandwidth becomes available.

Such previously known ABR methods are provided to increase utilization of bandwidth and/or other resources. A drawback of these methods is that they do not consider or determine whether actual perceptual quality of experience improvements, if any, achieved by an ABR-enabled client device justify the bias towards consuming available bandwidth. For example, a client device may select a 10 Mbps representation of a video stream segment over a 6 Mbps representation of the same video stream segment. However, depending on the content of the video stream segment (e.g., a movie scene with fast moving action versus a scene with mainly dialogue and little movement), the end user may not perceive an appreciable difference in playback quality. Without such an appreciable difference, the additional 4 Mbps bandwidth (or equivalent time) used to receive the 10 Mbps segment representation is misused, and could be utilized more productively.

Figure 1B:
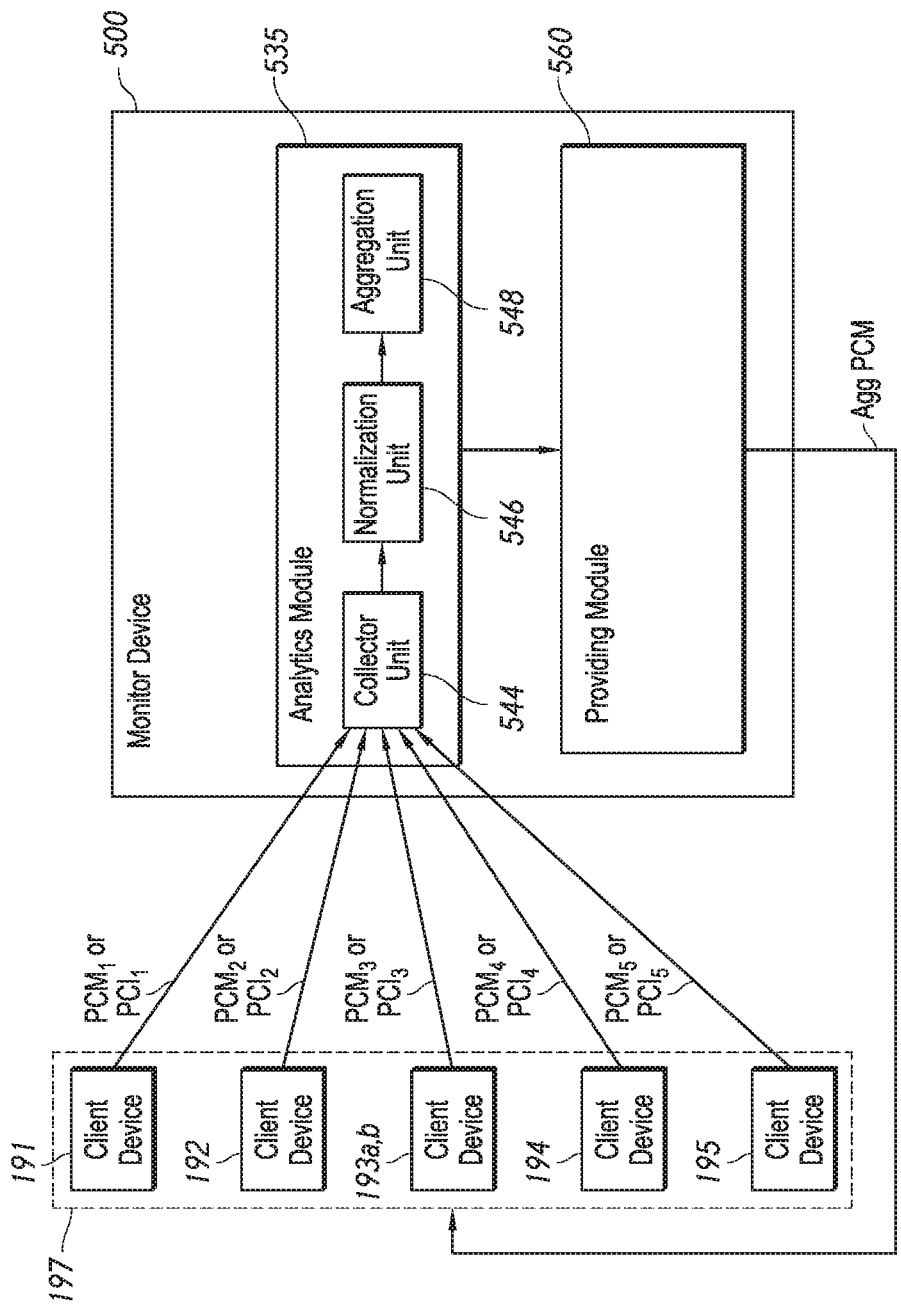
FIG. 1B is a data flow diagram associated with the data communication environment in FIG. 1A in accordance with some implementations.

FIG. 1B is a data flow diagram associated with the data communication environment 100 FIG. 1A in accordance with some implementations. As described in greater detail below, FIG. 1B illustrates the origination and/or flow of perceptual characterization metrics (PCMs) or perceptual characterization indicator (PCI) values from a group of client devices 197 that share one or more network resources (e.g., a bandwidth bottleneck) to components of the monitor device 500 (e.g., the headend node 150 or the gateway device 181).

More specifically, according to some embodiments, the client devices 191, 192, 193a/b, 194, and 195 provide $PCM_1$, $PCM_2$, $PCM_3$, $PCM_4$, and $PCM_5$, respectively, to the monitor device 500. Alternatively and/or additionally, in some embodiments, the client devices 191, 192, 193a/b, 194, and 195 provide sets of one or more values $PCI_1$, $PCI_2$, $PCI_3$, $PCI_4$, and $PCI_5$, respectively, to the monitor device 500. In turn and as described in greater detail below, FIG. 1B also illustrates the origination and/or flow of an aggregate PCM from the monitor device 500 to the group of client devices 197 that share the one or more network resources. According some implementations, the monitor device 500, as described below with reference to FIG. 5, includes an analytics module 540 and a providing module 560. In some implementations, the analytics module 540 includes a collector unit 544, a normalization unit 546, and an aggregation unit 548, which are also described in greater detail below with reference to FIG. 5.

Figure 2:
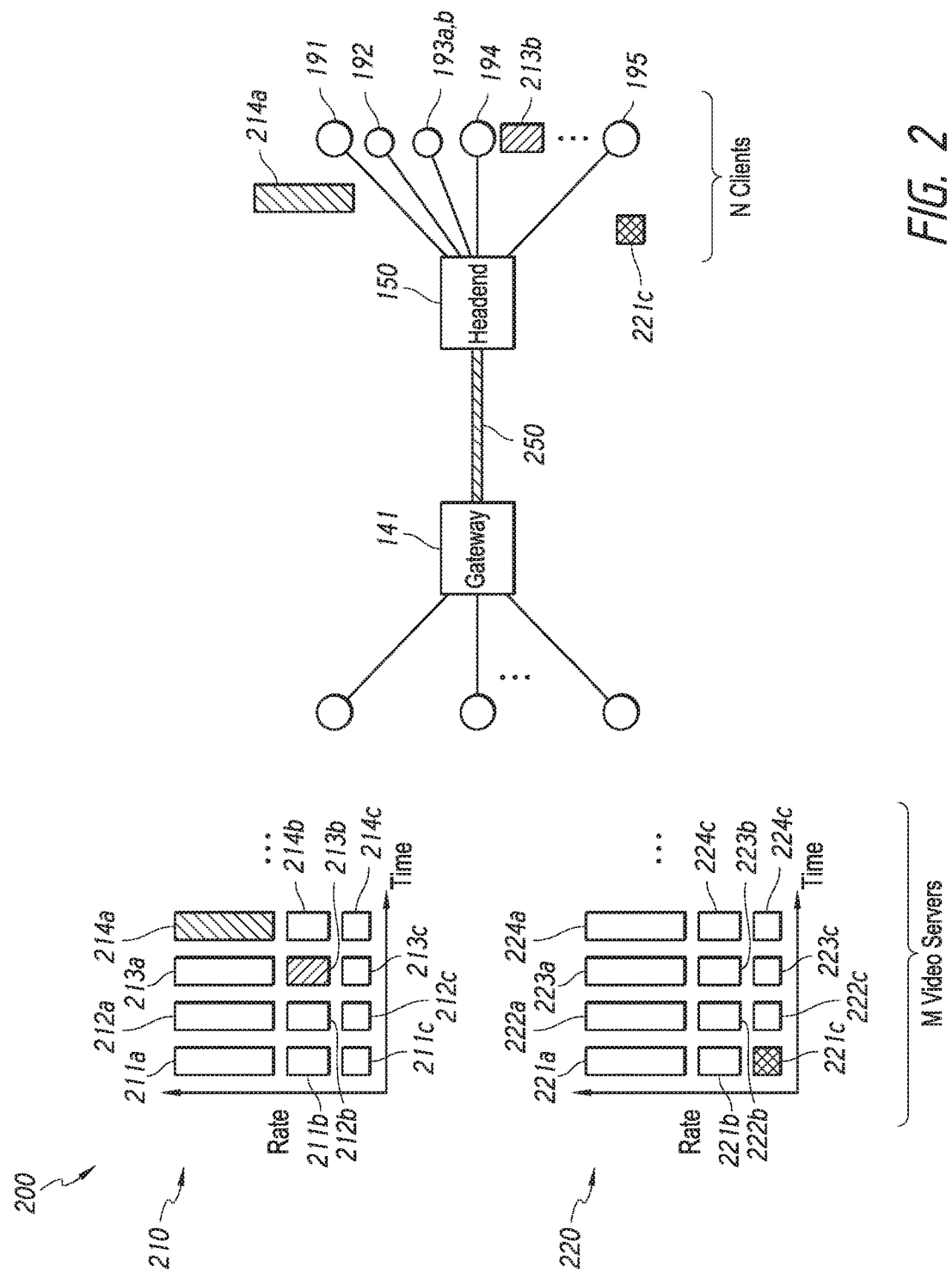
FIG. 2 is a block diagram of a data link congestion model in accordance with some implementations.

FIG. 2 is a block diagram of a data link congestion model 200 that illustrates the issues described above. The data link congestion model 200 shown in FIG. 2 is similar to an adapted from the data communication environment 100 provided in FIG. 1A. Elements common to FIGS. 1A and 2 include common reference numbers, and only the differences between FIGS. 1A and 2 are described herein for the sake of brevity. To that end, the congestion model 200 includes an example link 250 providing a shared allocation of bandwidth between the gateway node 141 and the headend node 150. The headend node 150 is ultimately coupled to the five client devices 191, 192, 193a/b, 194, and 195. Thus, in this example and in FIG. 1A, the total bandwidth available through the headend node 150 on the link 250 is ultimately shared by the five client devices 191, 192, 193a/b, 194, and 195.

The congestion model 200 in FIG. 2 also includes first and second media content data items 210, 220 stored at M video servers (not shown). The first media content data item 210 includes a first set of segment representations 211a,b,c, a second set of segment representations 212a,b,c, a third set of segment representations 213a,b,c, and a fourth set of segment representations 214a,b,c. The first set of segment representations 211a,b,c includes segment representations for a first temporal segment of the first media content data item 210. Similarly, the second, third and fourth sets of segment representations (212a,b,c, 213a,b,c, 214a,b,c) are for respective second, third and fourth temporal segments of the first media content data item 210.

Similarly, the second media content data item 220 includes a first set of segment representations 221a,b,c, a second set of segment representations 222a,b,c, a third set of segment representations 223a,b,c, and a fourth set of segment representations 224a,b,c. The first, second, third and fourth sets of segment representations (221a,b,c, 222a,b,c, 223a,b,c, 224a,b,c) are for respective first, second, third and fourth temporal segments of the second media content data item 220.

In operation, the five client devices 191, 192, 193a/b, 194, and 195 are each able to select segment representations. In some implementations, a client device selects a temporal segment based on a respective portion of the bandwidth on link 250 allocated to the client device. For example, as shown in FIG. 2, the client device 191 selects segment representation 214a, corresponding to the highest encoding rate available for the fourth temporal segment of the first media content data item 210. The client device 194 selects segment representation 213b, corresponding to the middle encoding rate available for the third temporal segment of the first media content data item 210. And, the client device 195 selects segment representation 221c, corresponding to the middle encoding rate available for the third temporal segment of the second media content data item 220. Additionally, in ABR-enabled implementations, a client device is able to exceed the bandwidth allocated to it when other portions of the bandwidth on link 250 are underutilized, and thus select segment representations with higher encoding rates that are normally supported by the bandwidth nominally allocation to the client device.

Figure 3:
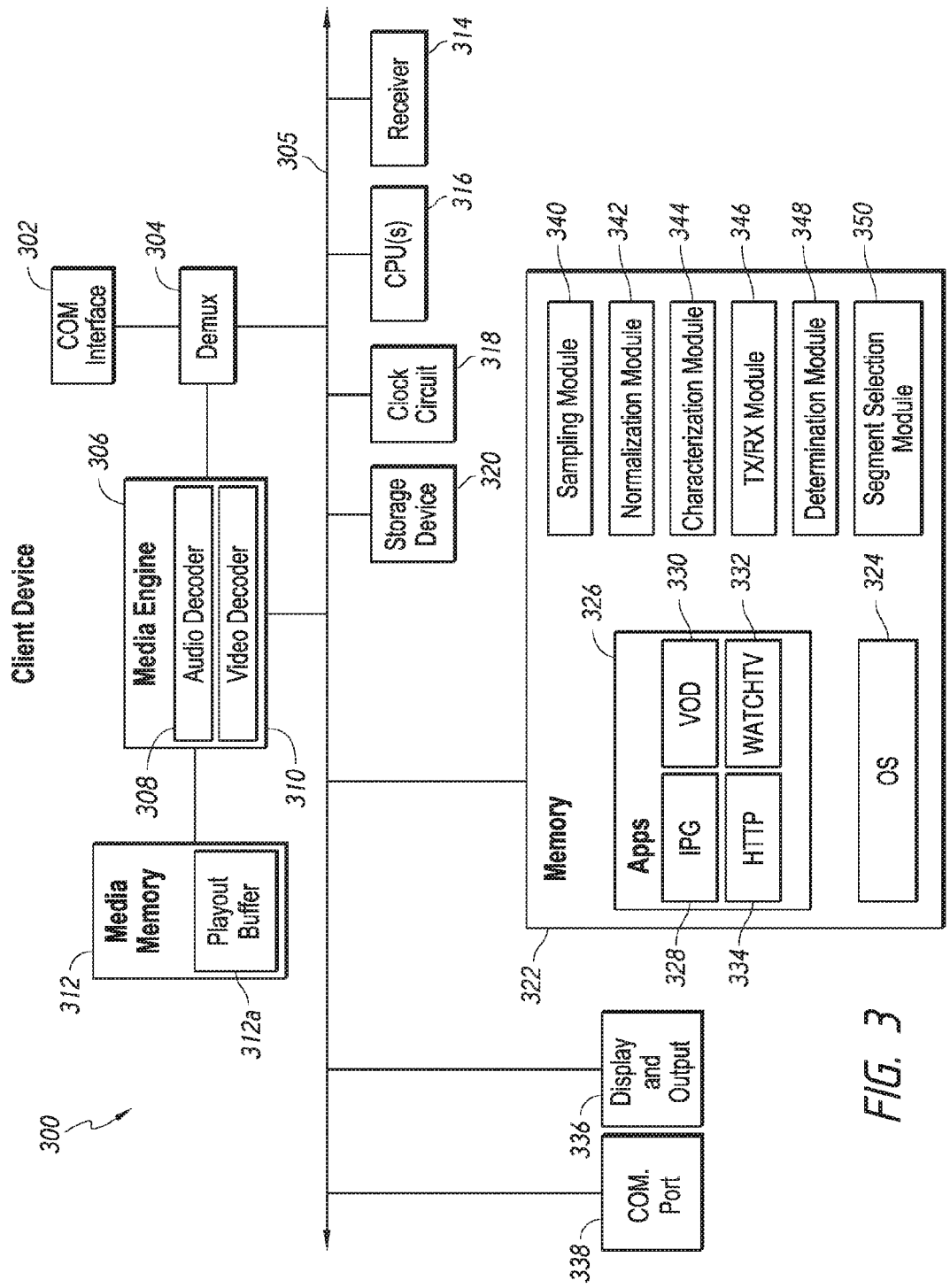
FIG. 3 is a block diagram of an example of a client device in accordance with some implementations.

Client devices generally include any suitable computing device, such as a computer, a laptop computer, a tablet device, a netbook, an internet kiosk, a personal digital assistant, a mobile phone, a smartphone, a gaming device, a computer server, etc. In some implementations, each client device includes one or more processors, one or more types of memory, a display and/or other user interface components such as a keyboard, a touch screen display, a mouse, a track-pad, a digital camera, and/or any number of supplemental devices to add functionality. As an example, FIG. 3 illustrates a block diagram of a configuration of a client device 300 in accordance with some implementations. While pertinent features are illustrated, those of ordinary skill in the art will appreciate from the present disclosure that various other features have not been illustrated for the sake of brevity and so as not to obscure more pertinent aspects of the example implementations disclosed herein.

In some implementations, the client device 300 includes a suitable combination of hardware, software, and/or firmware configured to provide at least some of protocol processing, modulation, demodulation, data buffering, power control, routing, switching, clock recovery, amplification, decoding, or error control. In some implementations, at least a portion of the control module and at least a portion of the plurality of optical communication devices are provided on a first substrate. For example, the client device 300 includes a communication (COM) interface 302. In some implementations, the COM interface 302 is suitable for communication over, among others, an IP network, a coaxial cable network, a hybrid-coaxial (HFC) network, and/or a wireless network. The COM interface 302 is coupled to a demultiplexer (demux) 304. The demux 304 is configured to parse the metadata (e.g., in the packet header or in the manifest) of segment representations and the body or payload data of the same. Metadata includes, for example, timestamp information, packet identifiers, program numbers, quality level, and/or other information useful for decoding and utilizing a received segment representation. The segment data and metadata information is provided to a media engine 306 as explained further below.

Although client device 300 is described in the context of various internet video streaming implementations, such as Internet Protocol Television (IPTV) and video on demand (VoD), the client device 300 may comprise additional and/or different components in various other implementations. For instance, in some implementations, the client device 300 includes a tuner system (e.g., radio frequency tuning circuitry, not shown) coupled to the COM interface 302. In some implementations, a tuner system includes one or more tuners for receiving transport streams received via the COM interface 302. Additionally and/or alternatively, in some implementations, a demodulator is employed to demodulate the received carrier signal and the demux 304 is configured to parse the transport stream packets of one or more defined carrier frequencies.

As shown in FIG. 3, the demux 304 is coupled to a bus 305 and to the media engine 306 (e.g., an audio/video (A/V) processing or decoding device). According to some implementations, the media engine 306 includes decoding logic including, for example, at least one of an audio decoder 308 or a video decoder 310. The media engine 306 also includes buffer management functionality to facilitate a determination as to the current buffer level within the client device 300. The media engine 306 is further coupled to the bus 305 and to a media memory 312. The media memory 312 includes one or more buffers (e.g., a playout buffer 312a) for temporarily storing compressed and/or reconstructed pictures and/or audio frames. In some implementations, the buffers of media memory 312 and/or other buffers (e.g., network buffers) reside in other memory devices, or distributed among the media memory 312 and the memory 322.

In some implementations, the client device 300 includes additional components coupled to the bus 305. For example, the client device 300 also includes a receiver 314 configured to receive user input. In some implementations, the client device 300 includes one or more processors (CPUs) 316 for executing and managing operations of the client device 300. In some implementations, the client device 300 includes a clock circuit 318 comprising phase and/or frequency locked-loop circuitry (or software, or combination of hardware and software) configured to synchronize clock information received in an audio, video, or A/V stream to facilitate decoding operations and to clock the output of reconstructed audiovisual content.

In some implementations, the client device 300 also includes a storage device 320 (and associated control logic) provided to temporarily store buffered content and/or to more permanently store recorded content. In some implementations, the memory 322 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 322 optionally includes one or more storage devices remotely located from the CPU(s) 316. The memory 322 comprises a non-transitory computer readable storage medium.

In some implementations, the memory 322 includes one or more applications 326 such as an interactive programming guide (IPG) 328, a VoD application 330, a WatchTV application 332 (associated with broadcast network TV), HTTP logic 334, among other applications such as pay-per-view, music, personal video recording (PVR), driver software, etc. In some implementations, profile selection logic includes HTTP client functionality, and may generate requests for segment representation from a content server (e.g., the content server 110).

Moreover, in some implementations, the memory 322 or the non-transitory computer readable storage medium of the memory 322 stores the following programs, modules and data structures, or a subset thereof including an optional operating system (OS) 324, a sampling module 340, a normalization module 342, a characterization module 344, a transceiver (Tx/Rx) module 346, a determination module 348, and a segment selection module 350.

In some implementations, the sampling module 340 is configured to determine or generate perceptual characterization indicator (PCI) values for a time window $T_N$. To that end, the sampling module 340 includes instructions, and heuristics and metadata.

In some implementations, the normalization module 342 is configured to normalize the PCI values based on one or more client device characterization factors associated with the device during the time window $T_N$. To that end, the normalization module 342 includes instructions, and heuristics and metadata.

In some implementations, the characterization module 344 is configured to determine a perceptual characterization metric (PCM) for the time window $T_N$ (e.g., a local QoE level value) based on the normalized PCI values. To that end, the characterization module 344 includes instructions, and heuristics and metadata.

In some implementations, the Tx/Rx module 346 is configured to provide (e.g., transmit) the PCM for the time window $T_N$ to a monitor device. In some implementations, the Tx/Rx module 346 is also configured to obtain (e.g., receive or retrieve) an aggregate PCM from the monitor device. To that end, the Tx/Rx module 346 includes instructions, and heuristics and metadata.

In some implementations, the determination module 348 is configured to determine whether to change a current playback profile (e.g., the current encoding rate or quality level) for a next time window $T_{N+1}$ based on relative performance between the PCM for time window $T_N$ and the aggregate PCM. To that end, the determination module 348 includes instructions, and heuristics and metadata.

In some implementations, the segment selection module 350 is configured to transmit a request to a content server for a segment of media content for the next time window $T_{N+1}$ that corresponds to the current playback profile when the PCM is within a threshold tolerance of the aggregate PCM. In some implementations, the segment selection module 350 is configured to transmit a request to a content server for a segment of media content for the next time window $T_{N+1}$ that corresponds to a higher quality playback profile (compared to the current playback profile) when the aggregate PCM exceeds the PCM. In some implementations, the segment selection module 350 is configured to transmit a request to a content server for a segment of media content for the next time window $T_{N+1}$ that corresponds to a lower quality playback profile (compared to the current playback profile) when the PCM exceeds the aggregate PCM. To that end, the segment selection module 350 includes instructions, and heuristics and metadata.

The client device 300 may be further configured with display and output logic 336, as indicated above that may include graphics and video processing pipelines, among other circuitry to process the decoded pictures and associated audio and provide for presentation (e.g., display) on, or associated with, a display device or other media device. A communications (COM.) port 338 (or ports) may further be included in the client device 300 for receiving information from and transmitting information to other devices. For instance, the communication port 338 may feature USB (Universal Serial Bus), Ethernet, IEEE-1394, serial, and/or parallel ports, etc. In addition, the communications port 338 may be configured for home networks (e.g., HPNA/MoCA, etc.). The client device 300 may also include an analog video input port for receiving analog video signals.

Figure 5:
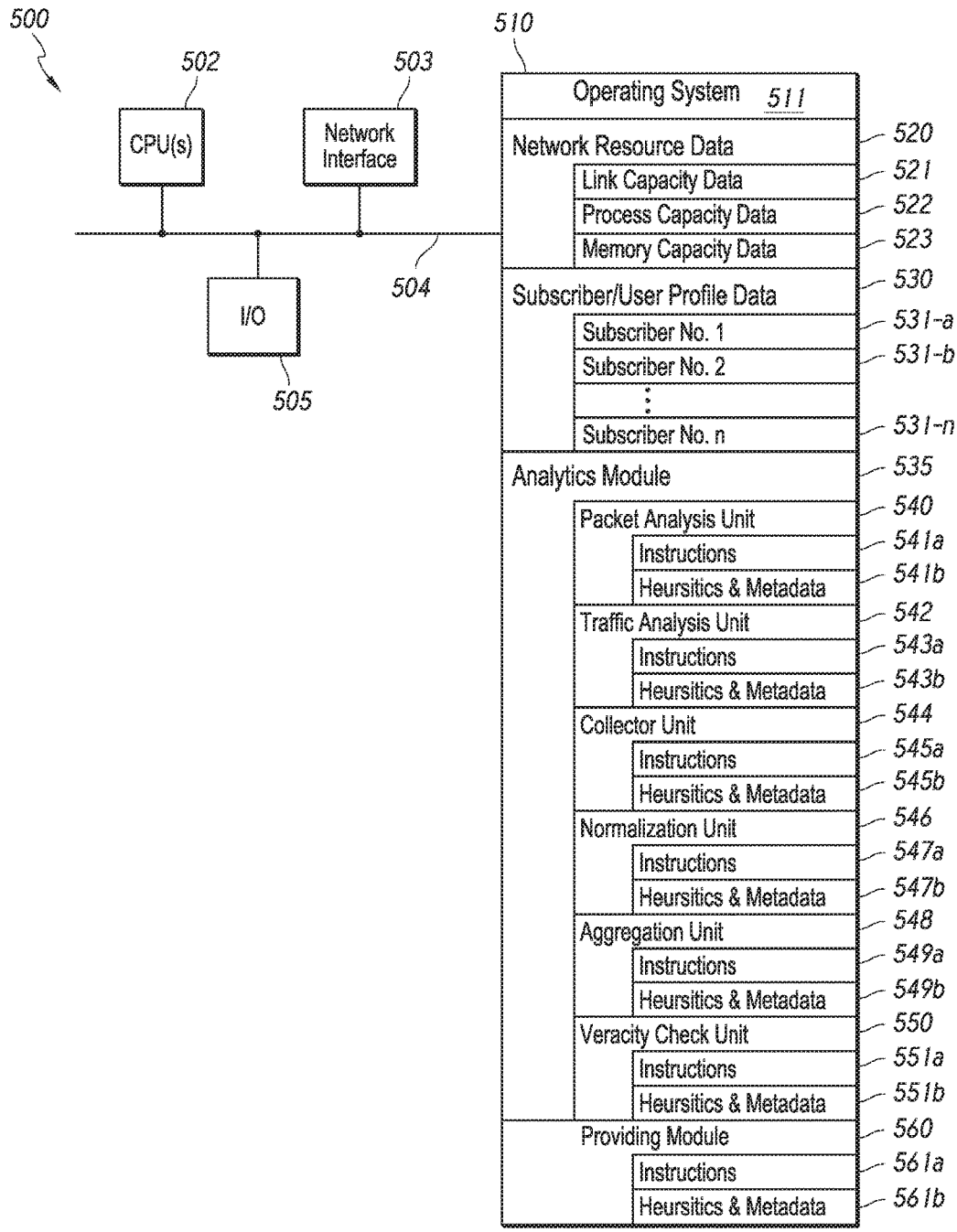
FIG. 5 is a block diagram of an example of a network resource management system in accordance with some implementations.

FIG. 5 is a block diagram of an example of a monitor device 500 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. As a non-limiting example, in some implementations the resource management system 500 includes one or more processing units (CPUs) 502, a network interface 503, memory 510, an I/O interface 505, and one or more communication buses 504 interconnecting the aforementioned and other components.

According to some implementations, the monitor device 500 corresponds to a gateway node (e.g., the gateway device 161 or the gateway device 181 in FIG. 1A). According to some implementations, the monitor device 500 corresponds to a headend node (e.g., the headend 150 in FIG. 1A). According to some implementations, the monitor device 500 corresponds to another node (e.g., the network administration node 142 in FIG. 1A). According to some implementations, the monitor device 500 is distributed amongst a suitable combination of the aforementioned nodes.

In some implementations, the communication buses 504 include circuitry that interconnects and controls communications between system components. The memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 510 optionally includes one or more storage devices remotely located from the CPU(s) 502. The memory 510 comprises a non-transitory computer readable storage medium. Moreover, in some implementations, the memory 510 or the non-transitory computer readable storage medium of the memory 510 stores the following programs, modules and data structures, or a subset thereof including an optional operating system 511, network resource data 520, subscriber/user profile data 530, an analytics module 535, and a providing module 560.

The operating system 511 includes procedures for handling various basic system services and for performing hardware dependent tasks. In some implementations, the network resource data 520 includes data associated with one or more shared network resources (e.g., bandwidth, processor time, memory, etc.). For example, as shown in FIG. 5, in some implementations, the network resource data 520 includes link capacity data 521, processor capacity data 522, and memory capacity data 523. In some implementations, the subscriber/user profile data 530 includes data associated with one or more subscriber gateway devices and/or subscriber client devices. For example, in some implementations, the subscriber/user profile data 530 includes subscriber policy limits for various client devices 531-*a*, 531*b*, . . . , 531-*n*. In some implementations, the subscriber policy limits and the like include the various levels of service that define a subscription tier model. For example, service levels define priority tiers, data throughput ranges, data throughput floors or ceilings, and degradation policies associated with the subscription tier model.

In some implementations, the analytics module 535 is configured enable a group of client devices that share one or more network resources to cooperatively participate in the consumption of the one or more network resources in order to produce more evenly distributed perceptual playback quality levels. According to some implementations, the analytics module 535 includes a packet analysis module 540, a traffic analysis module 542, a collector unit 544, a normalization unit 546, an aggregation unit 548, and a veracity check unit 550.

In some implementations, the packet analysis module 540 is configured to perform packet inspection of packets sent to and/or from client devices in order to determine encoding rates of segment representations and/or the like. To that end, the packet analysis module 540 includes instructions 541*a*, and heuristics and metadata 541*b*.

In some implementations, the traffic analysis module 542 is configured to monitor network traffic in order to identify a plurality of client devices associated with a shared network resource and to determine network resource utilization values for the plurality of client devices. Additionally and/or alternatively, in some implementations, the traffic analysis module 542 is configured to transmit an analysis request to the plurality of client devices for perceptual characterization metrics (PCMs) and/or perceptual characterization indicator (PCI) values. To that end, the traffic analysis module 542 includes instructions 543a, and heuristics and metadata 543b.

In some implementations, the collector unit 544 is configured to obtain (e.g., receive or retrieve) the PCMs and/or the PCI values from the plurality of client devices. To that end, the collector unit 544 includes instructions 545a, and heuristics and metadata 545b.

In some implementations, the normalization unit 546 is configured to normalize the PCMs and/or the PCI values based on subscription tiers (e.g., service levels) associated with the plurality of client devices, characterization factors associated with the one or more shared network resources, and/or the like. To that end, the collector unit 546 includes instructions 547a, and heuristics and metadata 547b.

In some implementations, the aggregation unit 548 is configured to generate an aggregate PCM based on the PCMs and/or the PCI values from each of the plurality of client devices. To that end, the aggregation unit 548 includes instructions 549a, and heuristics and metadata 549b.

In some implementations, the veracity check unit 550 is configured to perform a veracity check against the PCMs from the plurality of client devices based on trusted data from the content server 110 or based on packet analysis data from the packet analysis unit 540. To that end, the veracity check unit 550 includes instructions 551a, and heuristics and metadata 551b.

In some implementations, the providing module 560 is configured to provide the aggregate PCM to the plurality of client devices. To that end, the providing module 560 includes instructions 561a, and heuristics and metadata 561b.

Figure 6:
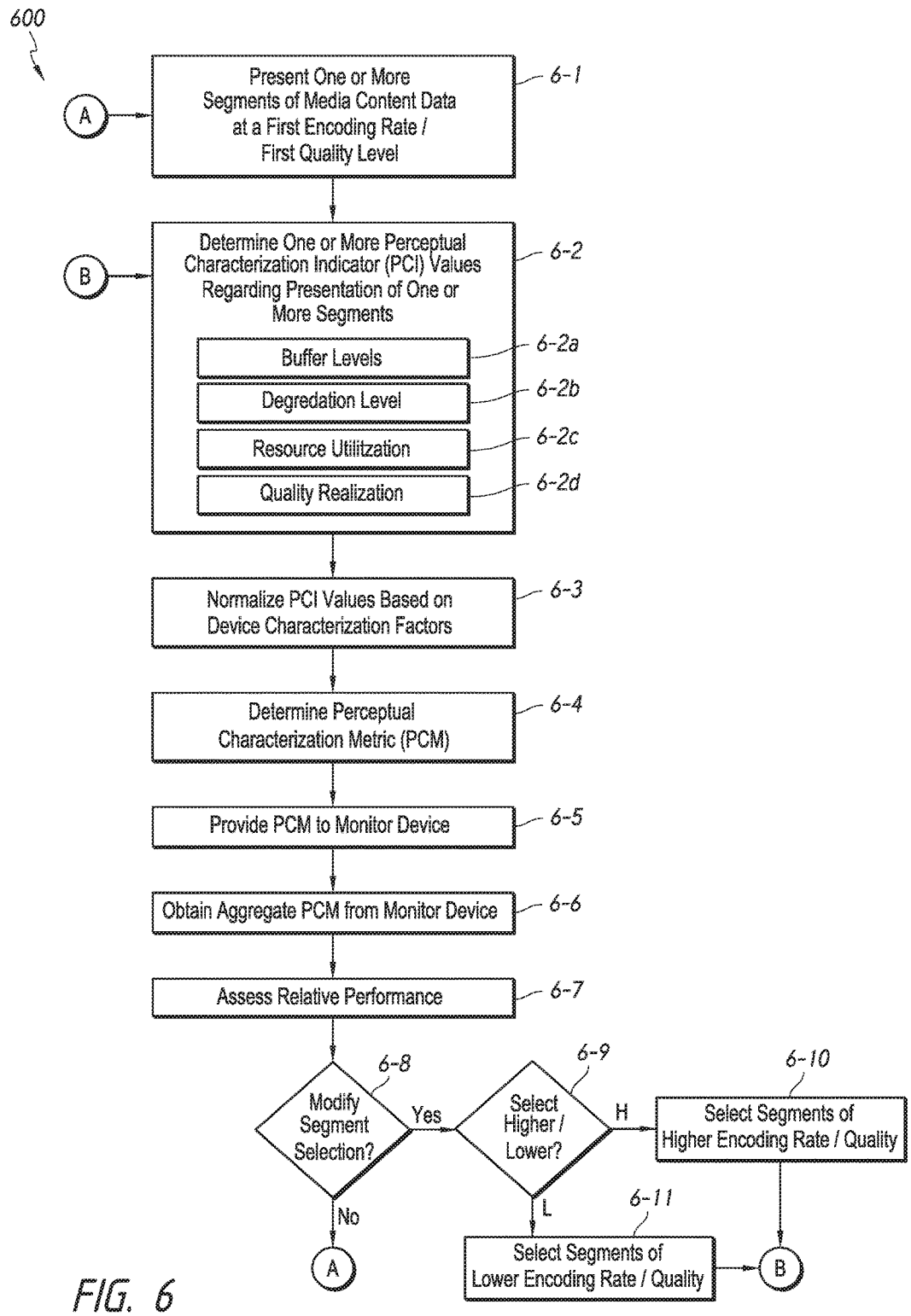
FIG. 6 is a flowchart representation of a method of assessing relative playback quality in accordance with some implementations.

FIG. 6 is a flowchart representation of a method 600 of assessing relative playback quality in accordance with some implementations. In some implementations, the method 600 is separately performed by one or more client devices (e.g., the client devices, 191, 192, 193a/b, 194, and 195 in FIG. 1A) that share one or more network resources (e.g., bandwidth associated with the gateway device 181 or the head-end node 150 in FIG. 1A). Briefly, the method 600 includes: presenting one or more first segments of media content data at a first encoding rate and/or first quality level; determining one or more perceptual characterization indicator (PCI) values regarding the playback or presentation of the one or more first segments; normalizing the one or more PCI values based on one or more client device characterization factors; determining a perceptual characterization metric (PCM) based on the normalized PCI values; providing the PCM to a monitor device; obtaining an aggregate PCM from the monitor device; and assessing the relative performance of the PCM against the aggregate PCM.

To that end, as represented by block 6-1, the method 600 includes presenting one or more first segments of media content data at a first encoding rate and/or first quality level (e.g., a first playback profile). For example, with reference to FIGS. 1A and 2, client device 171 selects and receives a first segment representation of the media content data item 210 (e.g., a movie) from the content server 110 or the cache server 130 as described above.

As represented by block 6-2, the method 600 includes determining one or more perceptual characterization indicator (PCI) values regarding the playback or presentation of the one or more first segments. In some implementations, the client device or a component thereof (e.g., the sampling module 340, FIG. 3) determines PCI values for a time window $T_N$. For example, in some implementations, each of the PCI values characterizes a corresponding performance criterion among a plurality of performance criteria. In some implementations, the performance criteria include, without limitation, the playback preference level, playback capability, degradation tolerance, one or more degradation policies, a buffer level criterion, and/or a resource utilization criterion. In some implementations, the performance criteria include, without limitation, the playback profile level, bit rate of the requested/received one or more segments, and/or quality of the requested/received one or more segments.

As an example, as represented by block 6-2a, determining the one or more PCI values includes obtaining a buffer level indicator value. The buffer level indicator value characterizes the utilization of a playout buffer of the client device. In some implementations, the buffer level indicator value provides an indication of the unavailable capacity or available capacity of the playout buffer. In some implementations, the buffer level indicator value approximates the time remaining before the playout buffer is empty. In some implementations, the buffer level indicator value provides at least one of an underflow indicator and overflow indicator.

In some implementations, as represented by block 6-2b, determining the one or more PCI values includes determining a degradation level value, which quantitatively characterizes the degradation of media content data as experienced at the client device. In some implementations, the degradation level value is produced by a function of the ratio between a predetermined degradation tolerance level and the actual degradation experienced at the client device. Similarly, in some implementations, determining the degradation level value includes calculating one or more degradation indicator values based on one or more degradation policies associated with a subscription tier model. Degradation polices define how perceptual playback quality of media content data is permitted to degrade for a client device in a particular subscription tier under various network conditions.

In some implementations, as represented by block 6-2c, determining the one or more PCI values includes calculating a resource utilization indicator value. The resource utilization indicator value characterizes how much of a resource the client device is using relative to the corresponding resource allocation provided to the client device in accordance with a subscription tier or the like.

In some implementations, as represented by block 6-2d, determining the one or more PCI values includes determining a playback quality realization metric. The playback quality realization metric characterizes how closely the client device is able achieve a predetermined playback preference level based on current network conditions and the playback capabilities of the client device. For example, in some implementations, the playback quality realization metric is determined as a function of the ratio between a predetermined playback preference level for a client device and the actual playback level achieved by the client device based on the network conditions. In some implementations, the playback quality realization metric is determined as a function of the utilization of the playback capability of the client device based on the network conditions. For example, based on the network conditions, a client device may be restricted to playing back a video stream at 720p even though the client device is capable of playing back a video stream at 1080p.

As represented by block 6-3, the method 600 includes normalizing the one or more PCI values based on one or more client device characterization factors. In some implementations, the client device or a component thereof (e.g., the normalization module 342, FIG. 3) normalizes the PCI values based on the one or more client device characterization factors. For example, in some implementations, the one or more client device characterization factors correspond to at least one of a connectivity status of the client device, a power level of the client device, a hardware profile associated with the client device (e.g., CPU frequency, number of CPU threads or cores, graphics processing unit (GPU), display size, display resolution, display aspect ratio, and/or the like), or a service tier associated with the client.

As one example, if the client device has a poor network connection due to its distance from an access point or network interference, the QoE associated with the playback of the media content is in turn due to the poor network connectivity of the client device and not due to the playback profile (e.g., the encoding rate or quality level of the current media content segment). As another example, if the client device has an outdated display with a low resolution, the QoE associated with the playback of the media content will in turn be poor due to the low resolution of the client device and not due to the playback profile (e.g., the encoding rate or quality level of the current media content segment). As yet another example, if the client device is operating under a power saving profile due to a low battery or the like, the QoE associated with the playback of the media content will in turn be poor due to tuning down hardware components of the client device under the power saving profile and not due to the playback profile (e.g., the encoding rate or quality level of the current media content segment). As such, in these examples, the PCI values are normalized to account for the poor network connectivity, low resolution, or power profile of the client device.

In some implementations, the one or more client device characterization factors includes movement data from an accelerometer, inclinometer, and/or gyroscope of the client device. For example, a user in motion may care less about the received video quality than a user sitting still. In some implementations, the one or more client device characterization factors also includes a user data quota or a data usage preference. For example, for cellular networks, a user whose overall data usage has approached his/her monthly total quota may be more willing to stay at lower quality than a user who has unlimited budget for data usage.

Alternatively and/or additionally, in some implementations, the client device or a component thereof (e.g., the normalization module 342, FIG. 3) normalizes the PCI values based on other factors corresponding to variations in content types and/or user subscription tiers. An example regarding content type, if Video 1 has a max profile rate at 3 Mbps, but Video 2 has a max profile rate equals 9 Mbps. In this example, the best QoE that can be achieved by a client device watching Video 1 is lower than Video 2. As such, the PCI values may be normalized based on this distinction in content types.

As represented by block 6-4, the method 600 includes determining a perceptual characterization metric (PCM) based on the normalized PCI values in order to produce a local quality of experience (QoE) level value for the client device. According to some implementations, the PCM provides a corresponding quantitative characterization of factors that determine QoE associated with the playback profile (e.g., the first encoding rate and/or the first quality level) of media content presented by the client device. In some implementations, the factors that characterize QoE include at least one of a mean square error (MSE), a peak signal-to-noise ratio (PSNR), a mean opinion score (MOS), a video quality metric, an encoding rate, subscription tier data, and/or the like. In some implementations, the PCM is a function of the set of normalized PCI values that include perception metrics characterizing relative performance associated with at least one of a plurality of performance criteria. In some implementations, the performance criteria include playback preference level, playback capability, degradation tolerance, one or more degradation policies, buffer level criteria, and a resource utilization criterion. In some implementations, the PCM is a function of average and/or variation of instantaneous PCI values. In some implementations, the PCM is a function of one or more raw PCI values, and the PCM is then normalized.

In some implementations, the client device or a component thereof (e.g., the characterization module 344, FIG. 3) determines the PCM based on the normalized PCI values from block 6-3. Accordingly, the local QoE level value provides a quantitative characterization of the perceptual playback quality of a representation of media content data received by the particular client device using one or more shared network resources.

In some implementations, determining the PCM includes aggregating the one or more normalized PCI values. For example, in some implementations, the aggregating includes generating a weighted combination (e.g., weighted sum, weighted average, etc.) of the one or more normalized PCI values associated with the client device. In another example, in some implementations, the aggregating includes generating a normalized combination (e.g., normalized sum, normalized average, etc.) of the one or more normalized PCI values associated with the client device.

As represented by block 6-5, the method 600 includes providing the PCM (e.g., the local QoE level value) to a monitor device. In some implementations, the client device or a component thereof (e.g., the Tx/Rx module 346, FIG. 3) provides the PCM to the monitor device. For example, the client device saves the PCM to a location accessible to the monitor device according to a predefined sample period, and the monitor device retrieves the PCMs from the client device according to a schedule. In another example, the client device transmits the PCM to the monitor device according to a predefined sample period. According to some implementations, the monitor device (e.g., the monitor device 500, FIG. 5) corresponds to a gateway node, a headend node, a network administration node, and/or a network analytics module.

As represented by block 6-6, the method 600 includes obtaining an aggregate PCM from the monitor device. In some implementations, the client device or a component thereof (e.g., the Tx/Rx module 346, FIG. 3) obtains the aggregate PCM from the monitor device. For example, the client device receives the aggregate PCM from the monitor device. In another example, the client device retrieves the aggregate PCM from a shared location. As described in further detail below with reference to FIG. 7, the aggregate PCM characterizes at least in part the relative PCMs (or local QoE level values) associated with a plurality of client devices sharing the shared network resource with the client device. In some implementations, the aggregate PCM is determined from a statistical analysis of respective PCMs (or local QoE level values) received from each of the client devices sharing a shared network resource. In some implementations, the aggregate PCM is a single value or a distribution of values. In some implementations, the aggregate PCM is anonymized so that the client device does not see the individual PCMs (e.g., the local QoE level values) or PCI values of the other client devices sharing the resource.

In some implementations, the providing of the PCM in block 6-5 and the obtaining of aggregate PCM in block 6-6 have a one-to-one relationship. In some implementations, providing of the PCM in block 6-5 and the obtaining of aggregate PCM in block 6-6 have an N-to-one relationship. In one example, the client device provides the PCM according to a time period (X) and the client device obtains the aggregate PCM for the same time period (X). In another example, the client device provides the PCM according to a time period (X) and the client device obtains the aggregate PCM for a different time period (2X, 3X, 5X, etc.).

As represented by block 6-7, the method 600 includes assessing the relative performance of the PCM against the aggregate PCM in order to determine whether or not, and when applicable how, to modify subsequent segment representation selections of media content data. In some implementations, the client device or a component thereof (e.g., the determination module 348, FIG. 3) determines whether to change a current playback profile (e.g., the current encoding rate or quality level) based on relative performance between the PCM determined for the client device in block 6-4 and the aggregate PCM obtained in block 6-6. According to some implementations, the assessment cycle is performed before every N media content segments are requested from a media content server (e.g., that serves transcoded media content based on the playback profile requested by the client device). As such, in some implementations, the client device is configured to raise or lower its own playback quality level (or local QoE level value) in order to facilitate more evenly distributed playback quality levels amongst the client devices sharing the network resource. In some implementations, the client device is configured to raise or lower its own playback quality level (or local QoE level value) in order to facilitate more evenly distributed playback quality levels amongst the client devices in a subscription tier sharing the network resource.

Figure 8:
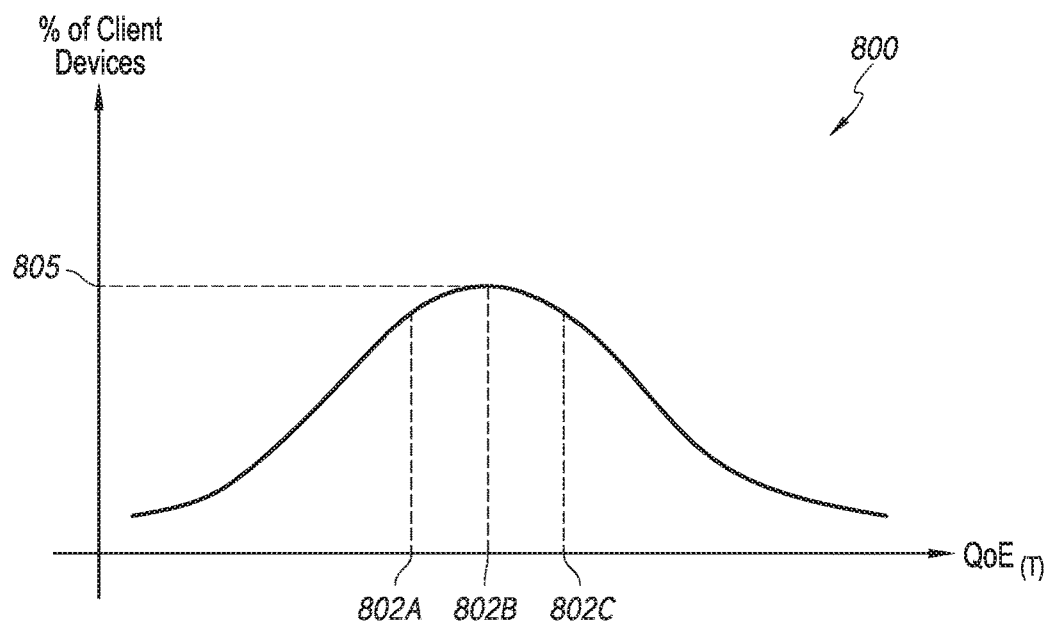
FIG. 8 illustrates quality of experience (QoE) distributions in accordance with some implementations.
Figure 8:
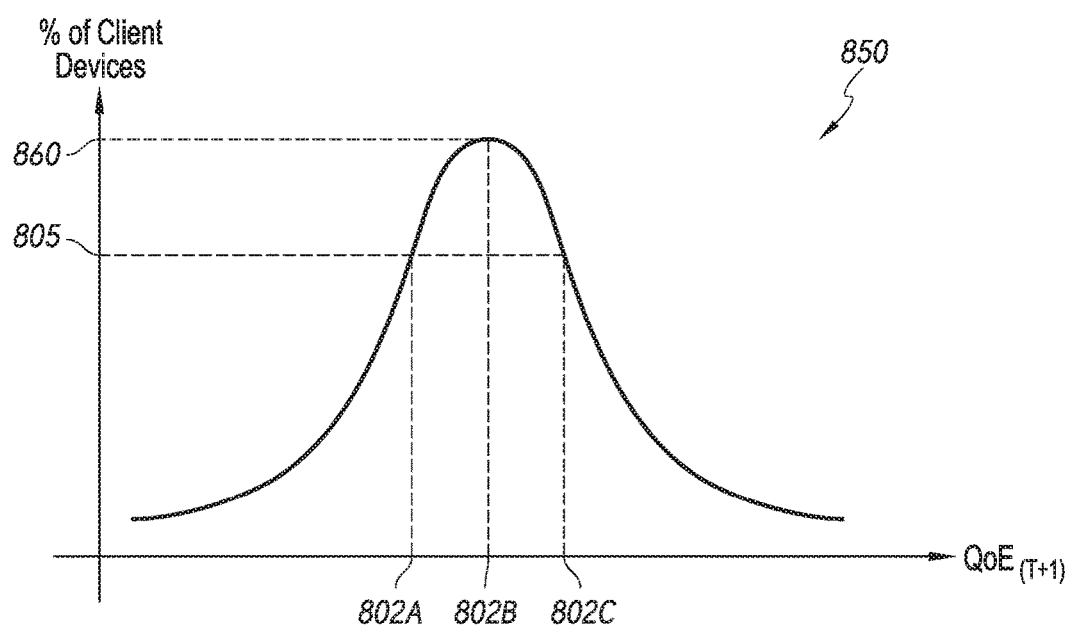

As one example, with reference to FIG. 8, the quality of experience (QoE) distribution 800 (e.g., a probability density function) shows the percentage of client devices versus QoE based on the PCMs from the plurality of client devices (including the PCM provided by the client device in block 6-5) for a time period (T). In FIG. 8, the QoE distribution 800 includes a 40th percentile marker 802A (e.g., a QoE value below which 40% of the observed QoE values are found), a 50th percentile marker 802B, and a 60th percentile marker 802C. In this example, the 50th percentile marker 802B corresponds to a value 805 associated with a first percentage of client devices. In some embodiments, the aggregate PCM obtained in block 6-6 corresponds to the QoE value associated with the 50th percentile marker 802B. In some embodiments, the aggregate PCM obtained in block 6-6 corresponds to the QoE values associated with each of the 40th percentile marker 802A, the 50th percentile marker 802B, and the 60th percentile marker 802C. In some embodiments, the aggregate PCM obtained in block 6-6 corresponds to the QoE distribution 800. In some embodiments, the aggregate PCM is defined in terms of a known statistical distribution (e.g., Gaussian/normal, Gamma, etc.) and its corresponding parameters (e.g., mean and/or variance for a normal distribution).

Thus for example, if the PCM determined for the client device in block 6-4 is associated with a QoE level value that falls within the QoE values between the 40th and 60th percentiles, the client device maintains the current playback profile. However, if the PCM determined for the client device in block 6-4 is associated with a QoE level value that falls below the QoE value for the 40th percentile, the client device selects a playback profile associated with a higher quality or encoding rate. And, if the PCM determined for the client device in block 6-4 is associated with a QoE level value that falls above the QoE value for the 60th percentile, the client device selects a playback profile associated with a lower quality or encoding rate.

As a result of the assessment cycle and the participation of plurality of client devices that share the one or more network resources, for example, with reference to FIG. 8, the QoE distribution 850 (e.g., a probability density function) for a subsequent time window (T+1) shows that the 50th percentile marker 802B corresponds to a value 860 associated with a second percentage of client devices, where the value 860 is greater than the value 805. As such, the percentage of client devices between the 40th and 60th QoE percentiles is greater for the subsequent time window (T+1) than for the time window (T). In other words, the plurality of client devices that share the one or more network resources converge on a QoE that is more equitable amongst the plurality of client devices.

As represented by block 6-8, the method 600 includes determining whether or not to modify a segment representation selection based on relative performance assessment. According to some implementations, if the aggregate PCM is within a threshold tolerance of the PCM for the client device, the segment representation selection does not change. For example, the aggregate PCM is within the threshold tolerance of the PCM for the client device when the relative performance of the client device substantially satisfies the performance criteria for a subscription tier and/or a preferred level. In turn, the method 600 ("No" path from block 6-8) circles back to the portion of the method represented by block 6-1 (or ends for an assessment cycle), and the respective allocations of the one or more shared network resources provided to the client device remain substantially unchanged.

On the other hand, if the PCM for the client device is either too high or too low as compared to the aggregate PCM, then the segment representation selection is subject to change. Thus, when modification of segment representation selection is warranted based on the assessment of relative performance ("Yes" path from block 6-8), as represented by block 6-9, the method 600 includes determining whether to select a higher bit-rate segment representation or a lower bit-rate segment representation. In some implementations, a higher bit-rate segment representation is selected when the aggregate PCM the PCM for the client device. Similarly, a lower bit-rate segment representation is selected when the PCM for the client device exceeds the aggregate PCM.

Accordingly, if selection of a higher bit-rate segment representation is determined ("H" path from block 6-9), as represented by block 6-10, the method 600 includes selecting one or more segments of a higher encoding rate and/or quality. On the other hand, if selection of a lower bit-rate segment representation is determined ("L" path from block 6-9), as represented by block 6-11, the method 600 includes selecting one or more segments of a lower encoding rate and/or quality. Following blocks 6-10 and 6-11, the method 600 circles back to the portion of the method represented by block 6-2 (or ends for an assessment cycle).

Figure 7:
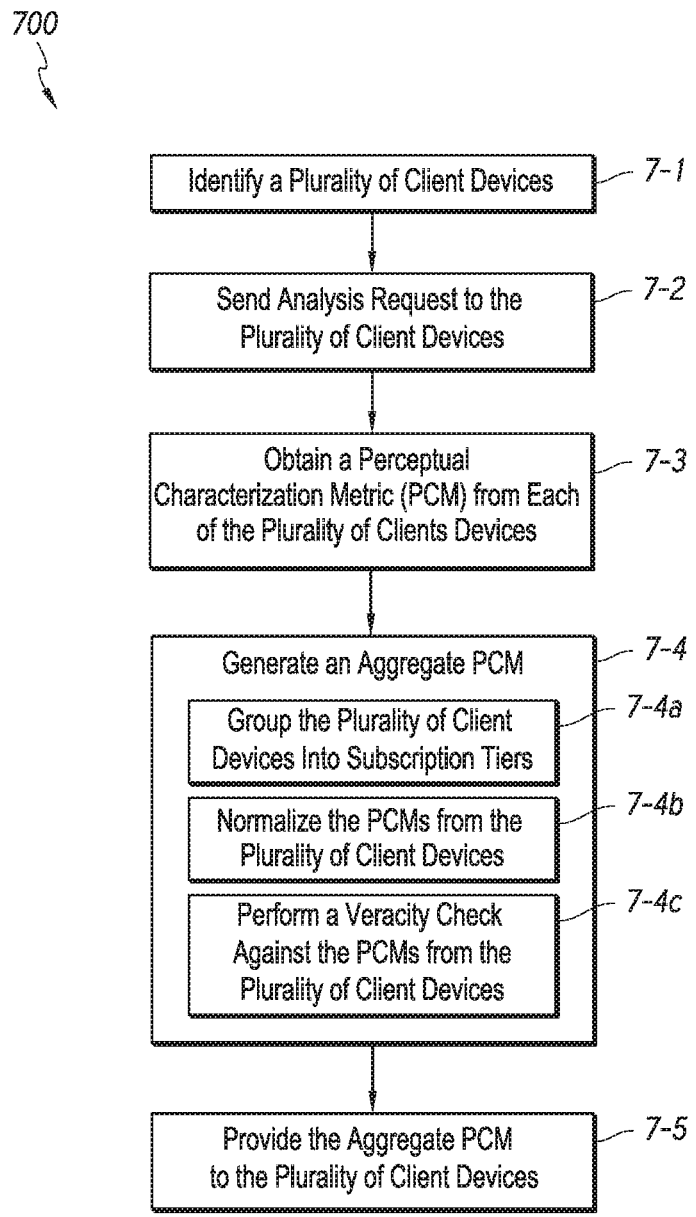
FIG. 7 is a flowchart representation of a method of enabling more evenly distributed perceptual playback quality levels among client devices that share one or more network resources in accordance with some implementations.

FIG. 7 is a flowchart representation of a method 700 of enabling more evenly distributed perceptual playback quality levels among client devices that share one or more network resources in accordance with some implementations. In some implementations, the method 700 is performed by a monitor device (e.g., the monitor device 500, FIG. 5). Briefly, the method 700 includes: identifying a plurality of client devices associated with a shared network resource; sending an analysis request to the plurality of client devices; obtaining a perceptual characterization metric (PCM) from each of the plurality of client devices; generating an aggregate PCM; and providing the aggregate PCM to the plurality of client devices.

According to some implementations, the monitor device corresponds to a gateway node (e.g., the gateway device 161 or the gateway device 181 in FIG. 1A). According to some implementations, the monitor device corresponds to a head-end node (e.g., the headend 150 in FIG. 1A). According to some implementations, the monitor device corresponds to another node (e.g., the network administration node 142 in FIG. 1A). According to some implementations, the monitor device is distributed amongst a suitable combination of the aforementioned nodes.

To that end, as represented by block 7-1, the method 700 includes identifying a plurality of client devices associated with a shared network resource. In some implementations, the monitor device or a component thereof (e.g., the traffic analysis module 542, FIG. 5) identifies a plurality of client devices associated with a shared network resource. According to some implementations, the monitor device performs a discovery process to determine the topology of the network (e.g., using the simple network management protocol (SNMP), the Internet control message protocol (ICMP), etc.) and to identify devices associated with the network resource (e.g., all devices consuming bandwidth associated with a network link).

As represented by block 7-2, the method 700 includes sending an analysis request to the plurality of client devices. In some implementations, the monitor device or a component thereof (e.g., the traffic analysis module 542, FIG. 5) transmits an analysis request to the plurality of client devices for perceptual characterization metrics (PCMs) for a specified time window $T_N$.

As represented by block 7-3, the method 700 includes obtaining PCMs from each of the plurality of client devices. In some implementations, the monitor device or a component thereof (e.g., the collector unit 544, FIG. 5) obtains a PCM from each of the plurality of client device for the time window $T_N$. For example, the monitor device retrieves the PCMs from each of the plurality of client devices. In another example, the monitor device receives the PCMs from each of the plurality of client devices. In some implementations, each of the PCMs provide a corresponding quantitative characterization of factors that determine quality of experience (QoE) associated with the use or presentation of media content data that is received by a respective one of the plurality of client devices. In some implementations, the PCMs are normalized by the client devices to take into on one or more client device characterization factors associated with the client devices. In some implementations, the monitor device or a component thereof (e.g., the collector unit 544, FIG. 5) obtains a set of perceptual characterization indicator (PCI) values from each of the plurality of client device for the time window $T_N$.

As represented by block 7-4, the method 700 includes generating an aggregate PCM based on the PCMs from each of the plurality of client devices. In some implementations, the monitor device or a component thereof (e.g., the aggregation unit 548, FIG. 5) generates an aggregate PCM based on the PCMs from each of the plurality of client devices. According to some implementations, the aggregate PCM characterizes at least in part the relative PCMs (or local QoE level values) associated with a plurality of client devices sharing the shared network resource with the client device. In some implementations, the aggregate PCM is determined from a statistical analysis of respective PCMs (or local QoE level values) received from each of the client devices sharing a shared network resource. In some implementations, the aggregate PCM is a single value or a distribution of values. In some implementations, the aggregate PCM is generated on a subscription tier basis.

As one example, with reference to FIG. 8, the monitor device generates the QoE distribution 800 that shows QoE versus the percentage of client devices based on the PCMs from the plurality of client devices. In FIG. 8, the QoE distribution includes a 40th percentile marker 802A, 50th percentile marker 802B, and a 60th percentile marker 802C. In this example, the 50th percentile marker 802B corresponds to QoE value below which 50% of the observed QoE values are found. According to some embodiments, as described with reference to block 7-5, the monitor device provides the aggregate PCM to the plurality of client devices. In some embodiments, the aggregate PCM corresponds to the QoE value that corresponds to the 50th percentile marker 802B. In some embodiments, the aggregate PCM corresponds to the QoE values for each of the 40th percentile marker 802A, the 50th percentile marker 802B, and the 60th percentile marker 802C. In some embodiments, the aggregate PCM corresponds to the QoE distribution 800.

In some implementations, the aggregate PCM is a vector such as aggregate QoE, aggregate buffer level or the like. As such, for example, the vector includes all the PCM values (or only part of them are aggregated). Thus, the client device has access to more information when later performing the "modify segment selection" portion of the method 600 (block 6-8 in FIG. 6).

In some implementations, the aggregate PCM and the PCMs obtained in block 7-3 are synchronous. In other words, the PCMs obtained in block 7-3 correspond to a time window $T_N$ and the aggregate PCM is based on a statistical analysis of respective PCMs received from each of the client devices sharing a shared network resource for the time window $T_N$. As such, there is a one-to-one relationship between the aggregate PCM and the PCMs obtained in block 7-3.

In some implementations, the aggregate PCM and the PCMs obtained in block 7-3 are asynchronous. In other words, the PCMs obtained in block 7-3 correspond to a time window $T_N$ and the aggregate PCM is based on a statistical analysis of respective PCMs received from each of the client devices sharing a shared network resource for the time window $T_N$ and one or more earlier time windows such as $T_{N-1}$. As such, in this example, the aggregate PCM corresponds to two PCMs from each of the client devices that correspond to time windows $T_N$ and $T_{N-1}$.

In some implementations, as represented by block 7-4a, generating the aggregate PCM includes grouping the plurality of client devices into subscription tiers. In some implementations, the monitor device or a component thereof groups the client devices (and their associated PCMs) into subscription tiers based on the subscriber/user profile data 530 and/or the PCMs from the plurality of client devices.

Figure 9:
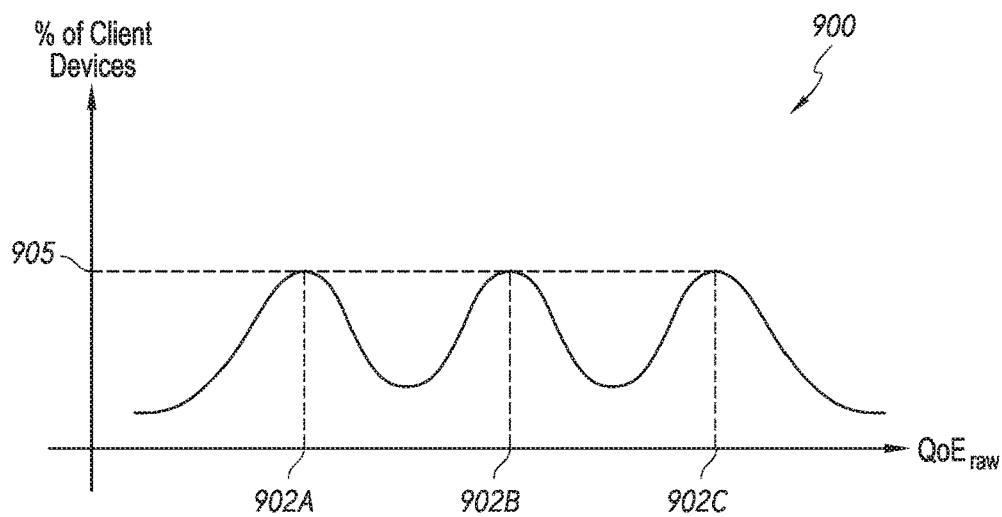
FIG. 9 illustrates QoE distributions in accordance with some implementations.
Figure 9:
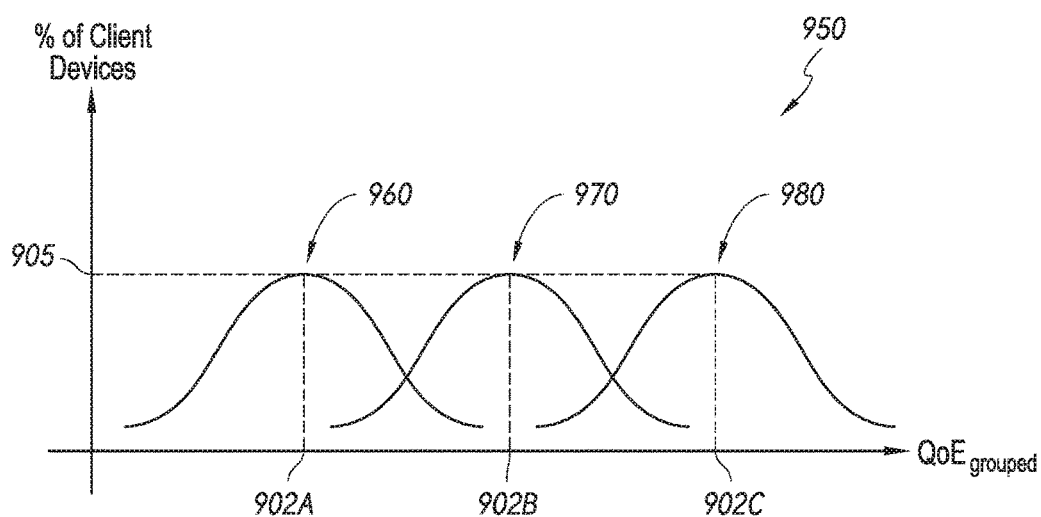
Figure 9:
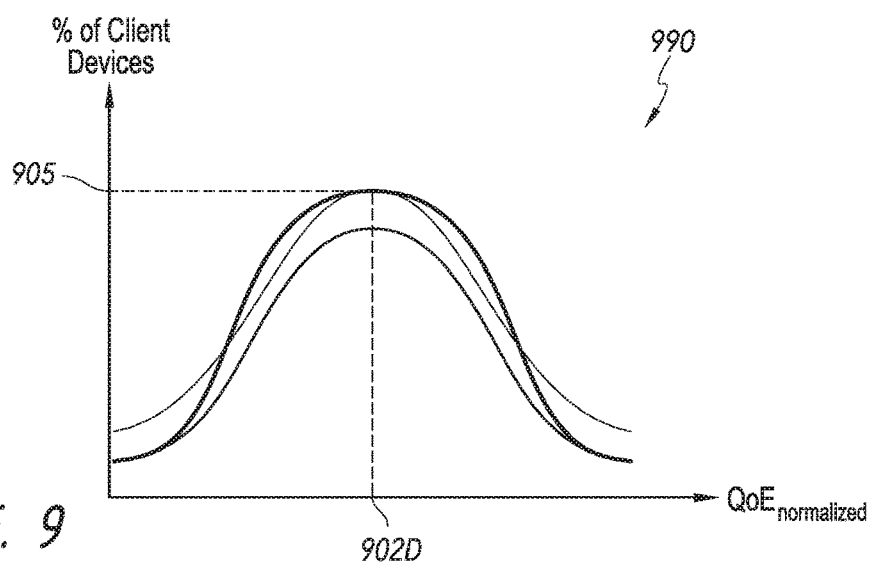

As one example, with reference to FIG. 9, the monitor device generates the quality of experience (QoE) distribution 900 that shows the percentage of client devices versus QoE based on the PCMs from the plurality of client devices. In FIG. 9, the QoE distribution 900 (e.g., a probability density function) includes three distinct peaks centered on a first percentile marker 902A (e.g., a QoE value below which 40% of the observed QoE values are found), a second percentile marker 902B, and a third percentile marker 902C, respectively. In this example, the three distinct peaks correspond to a value 905 associated with a respective percentage of client devices, however, in various other implementations, each of the peaks may be associated with different values.

According to some embodiments, the monitor device infers that the client devices that provided PCMs around the first percentile marker 902A are associated with a first subscription tier (e.g., a bronze tier with 1 Gbps bandwidth), that the client devices that provided PCMs around the second percentile marker 902B are associated with a second subscription tier (e.g., a silver tier with 2 Gbps bandwidth), and that the client devices that provided PCMs around the third percentile marker 902C are associated with a third subscription tier (e.g., a gold tier with 4 Gbps bandwidth). As such, the client devices are accordingly grouped into the first, second, and third subscription tiers. According to some implementations, the monitor device groups the PCMs from the first, second, and third subscription tiers by separating the distribution 900 into separate distributions 960, 970, and 980 for each of the subscription tiers as shown in graph 950.

In some implementations, as represented by block 7-4b, generating the aggregate PCM includes normalizing the PCMs from the plurality of client devices. In some implementations, the monitor device or a component thereof (e.g., the normalization unit 546, FIG. 5) normalize the PCMs based on subscription tiers associated with the plurality of client devices, characterization factors associated with the one or more shared network resources (e.g., network traffic or network connectivity), and/or the like. Continuing with the example above with respect to block 7-4a, with continued reference to FIG. 9, the monitor device normalizes the PCMs for each of the distributions 960, 970, and 980 corresponding to the different subscription tiers as shown in the graph 990, which is centered on percentile marker 902D. Thus, client devices are assessed against other client devices within their respective subscription tier to avoid skewing the results.

In some implementations, as represented by block 7-4c, generating the aggregate PCM includes performing a veracity check against the PCMs from the plurality of client devices. In some implementations, the monitor device or a component thereof (e.g., the veracity unit 550, FIG. 5) performs a veracity check by comparing trusted data, such as media stream information (e.g., downloaded bytes, encoding quality, etc. statistics), from the content server 110 (e.g., the media content streaming devices such as media servers, application servers, HTTP servers, CDNs, etc.) against the PCMs obtained in block 7-3. For example, the trusted data characterizes the video segments requested by the client devices for the time window $T_N$ associated with the PCMs. In some implementations, the monitor device or a component thereof (e.g., the veracity unit 550, FIG. 5) performs a veracity check by comparing packet analysis data, such as media stream information (e.g., downloaded bytes, encoding quality, etc. statistics) from the packet analysis unit 540, that corresponds against the PCMs. For example, the packet analysis data characterizes the video segments requested by the client devices for the time window $T_N$ associated with the PCMs.

As represented by block 7-5, the method 700 includes providing the aggregate PCM to the plurality of client devices. In some implementations, the monitor device or a component thereof (e.g., the providing module 560, FIG. 5) performs provides the aggregate PCM to the plurality of client devices. According to some implementations, the monitor device transmits the aggregate PCM to the plurality of client devices. According to some implementations, the monitor device publishes the aggregate PCM to a shared location that is accessible to the plurality of client devices. In some implementations, the aggregate PCM is transmitted or published on a subscription tier basis. In some implementations, the aggregate PCM is anonymized so that the client devices do not see the individual PCMs (e.g., the local QoE level values) or PCI values of the other client devices sharing the resource.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein. In another example, various portions of the disclosed methods may be practiced and/or performed in various sequences and/or combinations, including simultaneously.

It will also be understood that, although the terms "first," "second," etc. may be used herein to describe various elements, these elements should not be limited by these terms. These terms are only used to distinguish one element from another. For example, a first segment could be termed a second segment, and, similarly, a second segment could be termed a first segment, which changing the meaning of the description, so long as all occurrences of the "first segment" are renamed consistently and all occurrences of the "second segment" are renamed consistently. The first segment and the second segment are both segments, but they are not the same segment.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a client device with one or more processors and non-transitory memory:
determining, by the client device, a first perceptual characterization metric, wherein the first perceptual characterization metric provides a corresponding quantitative characterization of factors that determine quality of experience associated with a first playback profile of media content presented by the client device, and wherein the first perceptual characterization metric is a function of a first set of perceptual characterization indicator values that include perception metrics characterizing performance associated with at least one of a plurality of performance criteria;
normalizing, by the client device, the first perceptual characterization metric based on one or more client device characterization factors associated with the client device;
obtaining, by the client device, an aggregate perceptual characterization metric, wherein the aggregate perceptual characterization metric is based at least in part on the normalized perceptual characterization metric from the client device and one or more other perceptual characterization metrics from one or more other client devices sharing at least one network resource with the client device; and
determining, by the client device, whether to change the first playback profile based on a function of the first normalized perceptual characterization metric and the aggregate perceptual characterization metric.

2. The method of claim 1, further comprising:
determining, by the client device, whether the normalized perceptual characterization metric exceeds the aggregate perceptual characterization metric;
selecting, by the client device, a second playback profile according to the determination that the normalized perceptual characterization metric exceeds the aggregate perceptual characterization metric, wherein the second playback profile is associated with a lower media presentation quality than the first playback profile; and
transmitting, by the client device, a request to a content server for a segment of the media content based on the second playback profile.

3. The method of claim 1, further comprising:
determining, by the client device, whether the aggregate perceptual characterization metric exceeds the normalized perceptual characterization metric;
selecting, by the client device, a third playback profile according to the determination that aggregate perceptual characterization metric exceeds the normalized perceptual characterization metric, wherein the third playback profile is associated with a higher media presentation quality than the first playback profile; and
transmitting, by the client device, a request to a content server for a segment of the media content based on the third playback profile.

4. The method of claim 1, further comprising:
determining, by the client device, whether the normalized perceptual characterization metric is within a threshold tolerance of the aggregate perceptual characterization metric;
maintaining, by the client device, the first playback profile according to the determination that the first normalized perceptual characterization metric is within the threshold tolerance of the aggregate perceptual characterization metric; and
transmitting, by the client device, a request to a content server for a segment of the media content based on the first playback profile.

5. The method of claim 1, wherein the factors that characterize quality of experience include at least one of a peak-signal-to-noise ratio, a mean opinion score, a video quality metric, an encoding rate, and subscription tier data.

6. The method of claim 1, wherein the performance criteria include playback preference level, playback capability, degradation tolerance, one or more degradation policies, a buffer level criterion, and a resource utilization criterion.

7. The method of claim 1, wherein the one or more client device characterization factors associated with the client device correspond to at least one of a connectivity status of the client device, a power level of the client device, a hardware profile associated with the client device, or a service tier associated with the client device.

8. The method of claim 1, wherein the network resource corresponds to at least one of a memory resource, a computational resource, or a bandwidth resource shared between the client device and the one or more other client devices.

9. The method of claim 1, further comprising providing, by the client device, the normalized first perceptual characterization metric to a monitor device, wherein the aggregate perceptual characterization metric is obtained from the monitor device.

10. A client device comprising:
one or more processors;
a non-transitory memory; and
one or more programs stored in the non-transitory, which, when executed by the one or more processors, cause the client device to:
determine, by the client device, a first perceptual characterization metric, wherein the first perceptual characterization metric provides a corresponding quantitative characterization of factors that determine quality of experience associated with a first playback profile of media content presented by the client device, and wherein the first perceptual characterization metric is a function of a first set of perceptual characterization indicator values that include perception metrics characterizing relative performance associated with at least one of a plurality of performance criteria;
normalize, by the client device, the first perceptual characterization metric based on one or more client device characterization factors associated with the client device;
obtain, by the client device, an aggregate perceptual characterization metric, wherein the aggregate perceptual characterization metric is based at least in part on the normalized perceptual characterization metric from the client device and one or more other perceptual characterization metrics from one or more other client devices sharing at least one network resource with the client device; and determine, by the client device, whether to change the first playback profile based on a function of the first normalized perceptual characterization metric and the aggregate perceptual characterization metric.

11. The client device of claim 10, wherein the one or more programs further cause the client device to:

determine, by the client device, whether the normalized perceptual characterization metric exceeds the aggregate perceptual characterization metric;

select, by the client device, a second playback profile according to the determination that the normalized perceptual characterization metric exceeds the aggregate perceptual characterization metric, wherein the second playback profile is associated with a lower media presentation quality than the first playback profile; and transmit, by the client device, a request to a content server for a segment of the media content based on the second playback profile.

12. The client device of claim 10, wherein the one or more programs further cause the client device to:

determine, by the client device, whether the aggregate perceptual characterization metric exceeds the normalized perceptual characterization metric;

select, by the client device, a third playback profile according to the determination that aggregate perceptual characterization metric exceeds the normalized perceptual characterization metric, wherein the third playback profile is associated with a higher media presentation quality than the first playback profile; and transmit, by the client device, a request to a content server for a segment of the media content based on the third playback profile.

13. The client device of claim 10, wherein the one or more programs further cause the client device to:

determine, by the client device, whether the normalized perceptual characterization metric is within a threshold tolerance of the aggregate perceptual characterization metric;

maintain, by the client device, the first playback profile according to the determination that the first normalized perceptual characterization metric is within the threshold tolerance of the aggregate perceptual characterization metric; and transmit, by the client device, a request to a content server for a segment of the media content based on the first playback profile.

14. The client device of claim 10, wherein the factors that characterize quality of experience include at least one of a peak-signal-to-noise ratio, a mean opinion score, a video quality metric, an encoding rate, and subscription tier data.

15. The client device of claim 10, wherein the performance criteria include playback preference level, playback capability, degradation tolerance, one or more degradation policies, a buffer level criterion, and a resource utilization criterion.

16. The client device of claim 10, wherein the one or more client device characterization factors associated with the client device correspond to at least one of a connectivity status of the client device, a power level of the client device, a hardware profile associated with the client device, or a service tier associated with the client device.

17. A non-transitory memory storing one or more programs, the one or more programs comprising instructions, which, when executed by one or more processors of a client device, cause the client device to:

determine, by the client device, a first perceptual characterization metric, wherein the first perceptual characterization metric provides a corresponding quantitative characterization of factors that determine quality of experience associated with a first playback profile of media content presented by the client device, and wherein the first perceptual characterization metric is a function of a first set of perceptual characterization indicator values that include perception metrics characterizing relative performance associated with at least one of a plurality of performance criteria;

normalize, by the client device, the first perceptual characterization metric based on one or more client device characterization factors associated with the client device;

obtain, by the client device, an aggregate perceptual characterization metric, wherein the aggregate perceptual characterization metric is based at least in part on the normalized perceptual characterization metric from the client device and one or more other perceptual characterization metrics from one or more other client devices sharing at least one network resource with the client device; and determine, by the client device, whether to change the first playback profile based on a function of the first normalized perceptual characterization metric and the aggregate perceptual characterization metric.

18. The non-transitory memory of claim 17, wherein the one or more client device characterization factors associated with the client device correspond to at least one of a connectivity status of the client device, a power level of the client device, a hardware profile associated with the client device, or a service tier associated with the client device.

* * * * *